United States Patent
Zhao et al.

(10) Patent No.: US 12,058,581 B2
(45) Date of Patent: Aug. 6, 2024

(54) ENHANCEMENTS OF VoWi-Fi HANDOVER FROM ePDG TO LTE WHEN VoNR IS NOT SUPPORTED

(71) Applicant: QUALCOMM Incorporated, San Diego, CA (US)

(72) Inventors: Can Zhao, San Diego, CA (US); Suli Zhao, San Diego, CA (US); Reza Shahidi, San Diego, CA (US); Carlos Marcelo Dias Pazos, Carlsbad, CA (US); Kuo-Chun Lee, San Diego, CA (US); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2 days.

(21) Appl. No.: 17/085,915

(22) Filed: Oct. 30, 2020

(65) Prior Publication Data

US 2021/0136645 A1 May 6, 2021

Related U.S. Application Data

(60) Provisional application No. 62/928,447, filed on Oct. 31, 2019.

(51) Int. Cl.
*H04W 36/14* (2009.01)
*H04L 65/1016* (2022.01)
(Continued)

(52) U.S. Cl.
CPC ......... *H04W 36/14* (2013.01); *H04L 65/1016* (2013.01); *H04M 7/006* (2013.01); *H04W 36/30* (2013.01)

(58) Field of Classification Search
CPC .... H04L 65/1016; H04L 65/80; H04M 7/006; H04W 36/0022; H04W 36/14; H04W 36/30
See application file for complete search history.

(56) References Cited

U.S. PATENT DOCUMENTS

2012/0170552 A1* 7/2012 Oprescu-Surcobe ....................... H04W 28/16 370/332
2015/0245259 A1* 8/2015 Marcum ......... H04W 36/00837 455/437
(Continued)

FOREIGN PATENT DOCUMENTS

WO 2016045728 A1 3/2016
WO 2017026978 A1 2/2017
(Continued)

OTHER PUBLICATIONS

International Search Report and Written Opinion—PCT/US2020/058434—ISA/EPO—Feb. 22, 2021.

*Primary Examiner* — Khaled M Kassim
(74) *Attorney, Agent, or Firm* — Dalei Dong; The Marbury Law Group, PLLC

(57) ABSTRACT

Various aspects include methods for supporting handover of a Voice over Internet Protocol (IP) (VoIP) call, such as a Voice over Wi-Fi (VoWi-Fi) call, with a user equipment (UE). Various aspects may enable VoWi-Fi call handover from support via an evolved Packet Data Gateway (ePDG) to support via Long Term Evolution (LTE) when Voice over New Radio (NR) (VoNR) is not supported by a User Equipment (UE) computing device and/or a fifth generation (5G) standalone (SA) (5G SA) network in which the UE is located.

28 Claims, 23 Drawing Sheets

(51) Int. Cl.
*H04M 7/00* (2006.01)
*H04W 36/30* (2009.01)

(56) References Cited

U.S. PATENT DOCUMENTS

| | | | | |
|---|---|---|---|---|
| 2016/0337927 | A1* | 11/2016 | Hassan | H04W 36/165 |
| 2017/0237783 | A1 | 8/2017 | Yang et al. | |
| 2017/0339619 | A1* | 11/2017 | Meylan | H04W 36/14 |
| 2019/0373525 | A1* | 12/2019 | Singh | H04W 60/04 |
| 2020/0053134 | A1* | 2/2020 | Niemi | H04L 65/1016 |
| 2020/0153740 | A1* | 5/2020 | Singh | H04L 67/52 |
| 2021/0007023 | A1* | 1/2021 | Umapathy | H04W 36/00837 |
| 2021/0029611 | A1* | 1/2021 | Chong | H04W 36/0016 |
| 2021/0051530 | A1* | 2/2021 | Venkataraman | H04M 7/006 |
| 2021/0076264 | A1* | 3/2021 | Zhang | H04W 36/0022 |
| 2021/0105691 | A1* | 4/2021 | Zhu | H04L 43/0829 |
| 2021/0120461 | A1* | 4/2021 | Chong | H04W 36/0022 |
| 2021/0127314 | A1* | 4/2021 | Mukherjee | H04W 36/30 |
| 2022/0210822 | A1* | 6/2022 | Hassan | H04W 28/0268 |

FOREIGN PATENT DOCUMENTS

| | | |
|---|---|---|
| WO | 2017200687 A1 | 11/2017 |
| WO | 2018232560 | 12/2018 |

* cited by examiner

US 12,058,581 B2

ENHANCEMENTS OF VoWi-Fi HANDOVER FROM ePDG TO LTE WHEN VoNR IS NOT SUPPORTED

RELATED APPLICATIONS

This application claims the benefit of priority to U.S. Provisional Application No. 62/928,447 entitled "Enhancements of VoWi-Fi Handover From ePDG to LTE When VoNR is Not Supported" filed Oct. 31, 2019, the entire contents of which are incorporated herein by reference for all purposes.

BACKGROUND

Long Term Evolution (LTE), fifth generation (5G) new radio (NR), and other recently developed communication technologies allow wireless devices to communicate information at data rates (e.g., in terms of Gigabits per second, etc.) that are orders of magnitude greater than what was available just a few years ago.

Today's communication networks are also more secure, resilient to multipath fading, allow for lower network traffic latencies, provide better communication efficiencies (e.g., in terms of bits per second per unit of bandwidth used, etc.). These and other recent improvements have facilitated the emergence of the Internet of Things (IOT), large scale Machine to Machine (M2M) communication systems, autonomous vehicles, and other technologies that rely on consistent and secure communications.

SUMMARY

Various aspects include methods performed by a User Equipment (UE) computing device for supporting handover of a Voice over Internet Protocol (IP) (VoIP) call, such as a Voice over Wi-Fi (VoWi-Fi) call. Various aspects may enable VoWi-Fi call handover from support via an evolved Packet Data Gateway (ePDG) to support via Long Term Evolution (LTE) when Voice over New Radio (NR) (VoNR) is not supported by a fifth generation (5G) standalone (SA) (5G SA) network in which the UE computing device is located.

Various aspects include methods for supporting handover of a VoIP call by a UE computing device, such as a UE computing device located in a 5G SA network coverage area. In some aspects, the method may be performed by a processor of a UE computing device. Various aspects may include determining whether a voice call is active over a wireless local area network (WLAN) connection established by the UE computing device, determining whether VoNR is supported in response to determining that a voice call is active over the WLAN connection established by the UE computing device, and selecting LTE for handover of the voice call in response to determining that VoNR is not supported. In some aspects, selecting LTE for handover of the voice call may cause the UE computing device to handover an Internet Protocol (IP) Multimedia Subsystem (IMS) Packet Data Network (PDN) connection established using the WLAN connection directly to an LTE connection without attempting to establish the IMS PDN connection with an available 5G system (5GS) during the handover. In some aspects, determining that VoNR is not support may include determining that the UE computing device does not support VoNR or determining that the 5G SA network does not support VoNR. In some aspects, the WLAN connection may be Wi-Fi connection. In some aspects, handover of the voice call may occur while the UE computing device is in a 5G SA network coverage area. In various aspects, the handover of the voice call may be a handover of an IMS PDN connection from an evolved Packet Data Gateway (ePDG) to LTE.

In some aspects, selecting LTE for handover of the voice call in response to determining that VoNR is not supported may include prioritizing an LTE radio access technology (RAT) over a NR RAT in response to determining that VoNR is not supported. Various aspects may further include determining that the voice call transferred to LTE or the voice call ended, and prioritizing the NR RAT over the LTE RAT in response to determining that that the voice call transferred to LTE or the voice call ended. Various aspects may further include determining that VoNR is supported after prioritizing the LTE RAT over the NR RAT, and prioritizing the NR RAT over the LTE RAT in response to determining that VoNR is supported. In some aspects, prioritizing the LTE RAT may include ignoring redirection requests. Various aspects may further include determining that the NR RAT is actively in a connected state with the 5G SA network in response to prioritizing the LTE RAT over the NR RAT, and controlling the NR RAT to stay in the connected state until the NR RAT moves to an idle state.

Various aspects may further include determining whether an LTE signal measurement is above a quality threshold, and prioritizing the LTE RAT over the NR RAT in response to determining that the LTE signal measurement is above the quality threshold. Various aspects may further include determining whether a WLAN signal measurement is below a quality threshold and prioritizing the LTE RAT over the NR RAT in response to determining that the WLAN signal measurement is below the quality threshold. Various aspects may further include attaching the LTE RAT to an LTE cell after prioritizing the LTE RAT over the NR RAT. In some aspects, prioritizing the LTE RAT may include ignoring redirection requests after attaching the LTE RAT to the LTE cell.

In some aspects, selecting LTE for handover of the voice call in response to determining that VoNR is not supported may include determining whether the UE computing device is registered to the 5G SA network in response to determining that VoNR is not supported, determining whether a WLAN signal measurement is below a WLAN quality threshold or an LTE signal measurement is above a LTE quality threshold in response to determining that the UE computing device is registered to the 5G SA network, and sending a service request to trigger EPS fallback to the 5G SA network in response to determining that the WLAN signal measurement is below the WLAN quality threshold or the LTE signal measurement is above the LTE quality threshold. Some aspects may further include determining that EPS fallback is complete, and controlling an LTE radio access technology (RAT) to handover the voice call to an LTE connection. In some aspects, the handover of the voice call to the LTE connection may be a handover of the IMS PDN connection from the ePDG to LTE.

In some aspects, determining whether VoNR is supported in response to determining that the voice call is active over the WLAN connection established by the UE computing device may include determining whether EPS fallback occurs in response to determining that the voice call is active over the WLAN connection established by the UE computing device and prioritizing the LTE RAT over the NR RAT in response to determining that EPS fallback occurs.

Further aspects may include a UE having a processor configured to perform one or more operations of any of the methods summarized above. Further aspects may include a non-transitory processor-readable storage medium having stored thereon processor-executable instructions configured to cause a processor of a UE to perform operations of any of the methods summarized above. Further aspects include a UE having means for performing functions of any of the methods summarized above. Further aspects include a system on chip for use in a UE that includes a processor configured to perform one or more operations of any of the methods summarized above. Further aspects include a system in a package that includes two systems on chip for use in a UE that includes a processor configured to perform one or more operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
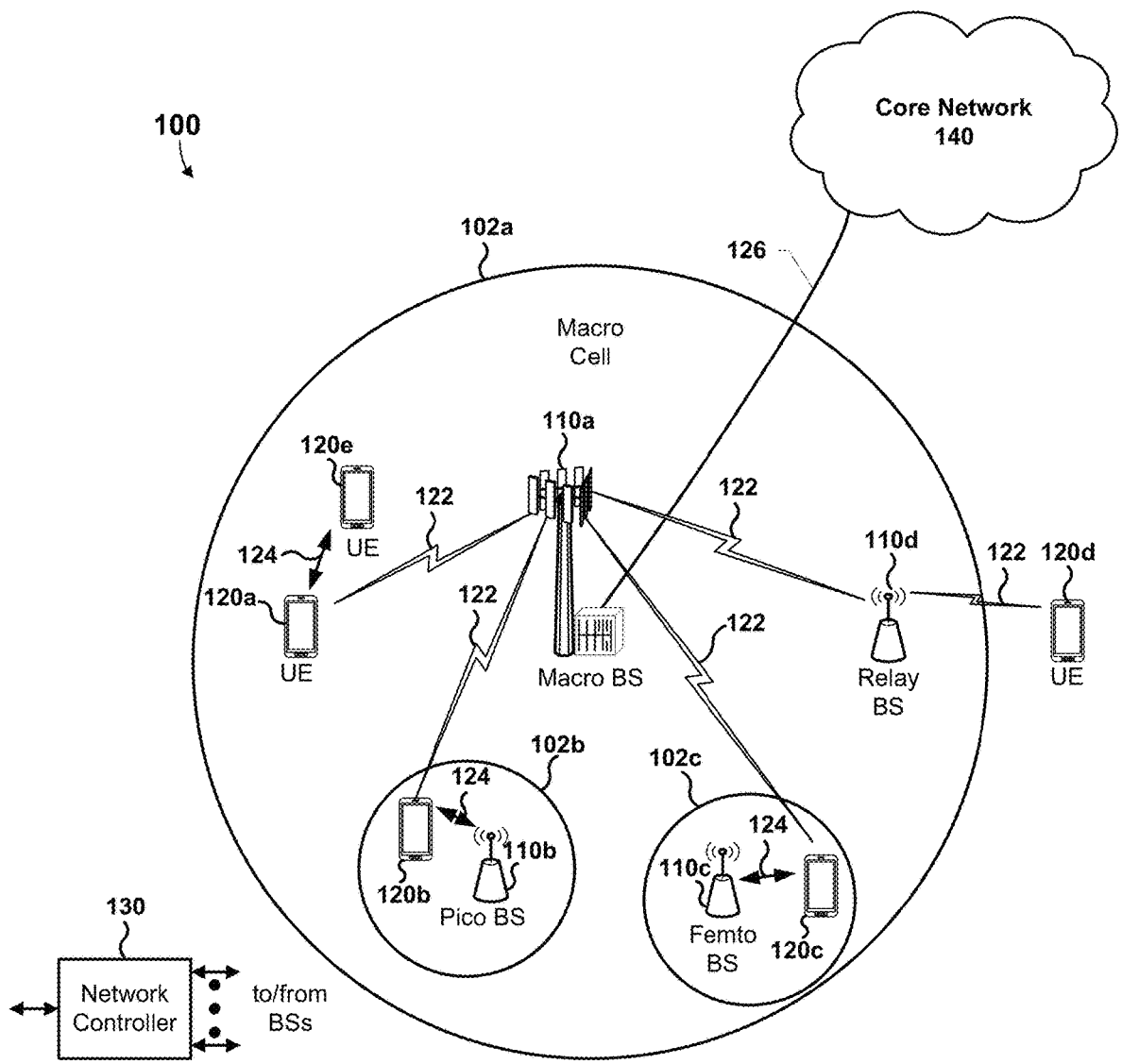
FIG. 1 is a system block diagram conceptually illustrating an example communications system.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "user equipment" (UE) and "UE computing device" are used herein to refer to any of wireless devices, some examples of which include smartphones, cellular telephones, wireless router devices, wireless appliances, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single UE. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multi-core processors, and each processor in an SOC may be referred to as a core. The term "multiprocessor" may be used herein to refer to a system or device that includes two or more processing units configured to read and execute program instructions.

Some 5G standalone (SA) (5G SA) networks do not support Voice over New Radio (VoNR). Rather, such 5G SA networks use Evolved Packet System (EPS) fallback for Voice over Internet Protocol (IP) (VoIP) calls in which the 5G SA network forces UEs to use LTE for VoIP calls. For example, in such 5G SA networks, when a VoIP call (e.g., a VoWi-Fi call) via the evolved Packet Data Gateway (ePDG) and a wireless local area network (WLAN), such as a Wi-Fi network, is active and the UE conducting the call needs to handover from the WLAN network to a wireless wide area network (WWAN) (e.g., the 5G SA network that does not support VoNR), the UE triggers Internet Protocol (IP) Multimedia Subsystem (IMS) Packet Data Network (PDN) handover from the ePDG to 5G with the 5G SA. As the 5G SA network does not support VoNR, the 5G SA network will trigger EPS fallback from NR to LTE during the IMS PDN handover process or during IMS quality of service (QoS) flow setup by directing the UE to use LTE for the VoIP call (e.g., the VoWi-Fi call). The UE receives the indication from the 5G SA network to use LTE and the UE performs LTE cell selection to handover the IMS PDN connection. The need for the UE to move to 5G SA first, followed by then EPS fallback, in such current 5G SA networks that do not support VoNR, may cause wasted signaling overhead and delay in establishing the VoIP call (e.g., the VoWi-Fi call) over a WWAN connection (e.g., LTE).

Various embodiments support handover of a VoIP call, such as a VoWi-Fi call, when a UE computing device may be in a 5G SA network coverage area. Various embodiments may enable VoWi-Fi call handover from support via an ePDG to support via LTE when VoNR is not supported by a UE computing device and/or a 5G SA network. Various embodiments are discussed generally in relation to VoIP calls, such as VoWi-Fi calls, and may apply to any type VoIP calls, including non-emergency VoWi-Fi calls, emergency VoWi-Fi calls, etc. In various embodiments, the handover of the voice call may be a handover of an IMS PDN connection from the ePDG to LTE.

In some embodiments, when a VoIP call (e.g., a VoWi-Fi call) is active, a UE computing device may prioritize LTE over NR in response to determining the UE computing device and/or the WWAN network (e.g., a 5G SA network) in which the UE computing device is located do not support VoNR.

In some embodiments, after prioritizing LTE over NR, in response to determining that LTE coverage is available, a UE computing device may reselect to use an LTE RAT for a VoIP call (e.g., a VoWi-Fi call). In some embodiments, a UE computing device may transition to a connected state with an LTE cell to perform a signaling procedure, such as a tracking area update (TAU) procedure. In some embodiments, when the UE computing device is prioritizing LTE over NR (such as when the signaling procedure with the LTE cell is complete), the UE computing device may ignore network messages to redirect from LTE to NR, such as radio resource control (RRC) release message with redirection to NR and/or PSHO messages and remain on LTE. In some embodiments, the UE computing device may temporarily switch to NR even though LTE may be prioritized over NR when the UE computing device does not have uplink (UL) pending data.

In some embodiments, the UE computing device may stay connected on 5G NR despite LTE being prioritized over NR. For example, when the UE computing device is in connected mode on 5G SA while the LTE priority is changed to be higher than NR, the UE computing device may stay on 5G SA until the UE computing device moves to an idle state.

In some embodiments, in response to a VoIP call (e.g., a VoWi-Fi call) ending, the UE computing device may change the RAT priority such that NR is prioritized over LTE. In some embodiments, in response to determining that the network currently does support VoNR, the UE computing device may change the RAT priority such that NR is prioritized over LTE.

In some embodiments, a normal state of operation for a UE computing device may be a state in which a NR may be prioritized over LTE by the UE computing device. In some embodiments, an LTE prioritization state may be a state in which LTE is prioritized over NR by the UE computing device. In some embodiments, the LTE prioritization state may be implemented by adjusting values related to radio resource control (RRC) and/or non-access stratum (NAS) functions of the UE computing device, such as RRC and/or NAS values of a modem of the UE computing device. In some embodiments, in the LTE prioritization state, the UE computing device may attach to an LTE cell. The UE computing device attaching to the LTE cell may be an LTE attached substate of the LTE prioritization state. In this LTE attached substate, the UE computing device may stay on LTE and be ready for VoWi-Fi call handover from WLAN to LTE. In some embodiments, in the LTE attached substate, the UE computing device may ignore redirection requests as part of prioritizing the LTE RAT. In some embodiments, entering the LTE prioritization state may reduce the time required to switch a call from VoWi-Fi to LTE. In some embodiments, entering the LTE prioritization state may reduce need for the UE computing device to display a 5G icon as the UE computing device may transition directly from VoWi-Fi to LTE for a VoIP call.

In various embodiments, the UE computing device may be configured such that different operations occur in the LTE prioritization state depending on the state of the UE computing device and the UE computing device's various RATs, such as the LTE RAT and/or NR RAT. As one example, in the LTE prioritization state, when the UE is in connected mode in NR, the UE computing device may store prioritization values and follow network commands to change RATs. As another example, in the LTE prioritization state, when the UE is in idle mode in NR or in inactive mode in NR, the UE computing device may make the NR RAT the lowest priority RAT (for example by reducing the NR frequency priority by a value of 8 as the normal priority is not more than 7.8). As one example, in the LTE prioritization state, when the UE is in connected mode in LTE, the UE computing device may store prioritization values and follow network commands to change RATs. As another example, in the LTE prioritization state, when the UE is in idle mode in LTE, the UE computing device may make the NR RAT the lowest priority RAT (for example by reducing the NR frequency priority by a value of 8). As a further example, in the LTE prioritization state, when the UE is out of service (OOS), the UE computing device may perform a scan and set the RAT order such that LTE is greater than NR. As a further example, in the LTE prioritization state, when the UE is performing a public land mobile network (PLMN) and/or cell selection, the UE computing device may set the RAT order such that LTE is greater than NR (for example by sorting the cell selection list such that LTE cells are ordered before NR cells). As a further example, in the LTE prioritization state, when the UE is performing a gateway transition (GWT), the UE computing device may store prioritization values for use in other states.

In some embodiments, the UE computing device may be configured to enter the LTE prioritization state in response to determining that a VoIP call (e.g., a VoWi-Fi) call is initiated on the UE computing device and the UE computing device (or the network) do not support VoNR. In some embodiments, the UE computing device may be configured to return from an LTE prioritization state to a normal state of operation in response to determining an IMS call is no longer ongoing.

In some embodiments, the UE computing device may be configured to enter the LTE prioritization state in response to determining a WLAN and/or LTE signal condition is met. In some embodiments, in response to determining an LTE signal measurement is above a quality threshold, the UE computing device may be configured to enter the LTE prioritization state. As one example, when IMS is set such that WWAN is preferred and the LTE signal strength rise above a quality threshold value, the UE computing device may enter the LTE prioritization state. In some embodiments, in response to determining a WLAN signal measurement is below a quality threshold, the UE computing device may be configured to enter the LTE prioritization state. As an example, when IMS is set to WLAN preferred (e.g., Wi-Fi preferred) and WLAN quality (e.g., Wi-Fi quality) becomes unsuitable the UE computing device may be configured to enter the LTE prioritization state. As an example, the WLAN quality may be unsuitable when the WLAN packet error rate and/or the WLAN signal strength indicate the WLAN quality is below a threshold set for acceptable for voice and/or video services.

In some embodiments, radio manager application running on a processor of the UE computing device, such as a radio manager application running on a modem processor, etc., may control the UE computing device to enter the LTE prioritization state, enter the LTE attached substate, and/or to enter the normal state. In some embodiments, the radio manager may control a modem of the UE computing device such that in the LTE prioritization state the UE computing device may deprioritize NR. In some embodiments, the radio manager may be configured to handle concurrent network initiated prioritization of NR and/or LTE, for example by the use of concurrent state machines tracking network and UE computing device states. In some embodiments, the radio manager may monitor and control access stratum procedures to prioritize and/or deprioritize LTE and/or NR RATs. In some embodiments, the radio manager may control the modem of the UE computing device to ignore redirection to NR requests and remain on LTE in the LTE attached substate.

As one example, a radio manager may control access stratum procedures of a modem of a UE computing device such that in the LTE prioritization state the UE computing device may deprioritize NR. As a specific example, in the LTE prioritization state the radio manager may trigger lower layers of the access stratum to deprioritize an NR RAT. The radio manager may overwrite values, such as 5G SA controlled network values, associated with LTE and/or NR RRC to prioritize an LTE RAT and/or deprioritize a NR RAT. As one example, the prioritization type (e.g., deprioritizationType) may be set to NR and a prioritization timer (e.g., deprioritizationTime or T325) may be set to a large value, such as 30 minutes, infinity, etc. As an example, after the VoWi-Fi call ends or the call moves to being conducted over a cellular connection, the radio manager may cancel prioritization of the NR RAT. As a specific example, prioritization of the NR RAT may be achieved by lowering the cell reselection priority of all NR frequencies, such that the CellReselectionPriority element in the System Information Blocks (SIBs) (e.g., SIB24 for LTE, SIB5 for NR, etc.) is reduced by eight as normal CellReselectionPriority value is not more than 7.8. Such cell reselection prioritization may apply to the UE in RRC idle and inactive modes. As another example, to support the UE computing device cell reselection from NR to LTE quickly, the radio manager may prioritize LTE by overwriting the thresholds for going to LTE and setting those thresholds low in the NR SIBS. For example, the thresX,HighP may be set to zero and the thresX,HighQ may be set to zero. As another example, to support the UE computing device staying in LTE, the radio manager may prioritize LTE by overwriting the reselect thresholds in the NR SIBS and setting those thresholds to a small value. For example, the Treselection value in the NR SIB 5 may be set to 1 second. As another example, to support the UE computing device staying in LTE, the radio manager may prioritize LTE by overwriting the thresholds for going to NR and setting those thresholds high in the LTE SIB24. For example, the thresX,LowP may be set to 31 and the thresX,LowQ may be set to 31. As a further example, prioritization of the NR RAT may be applied in PLMN/cell selection. For example, the RAT priority order may be changed such that LTE has a higher priority than NR in system selection. In some embodiments, an E911 call on Wi-Fi may be treated as a normal call if E911 is on Wi-Fi.

In some embodiments, the radio manager may be configured to handle concurrent network initiated prioritization of NR and/or LTE. As one example, when the network triggers NR RAT prioritization before or after the radio manager has triggered NR RAT prioritization, the radio manager may track the RAT prioritization on two state machines with two independent timers. The NR RAT may resume normal prioritization after both of the respective timers of the two state machines have expired. As another example, the network may trigger LTE prioritization while the radio manager has already triggered NR prioritization. The NR prioritization may be canceled until the T325 timer of the LTE prioritization expires. The LTE RRC may be configured to forward prioritization requests to the NR RRC when receiving LTE RAT prioritization requests from the network. Additionally, the radio manager may cause the UE computing device to go to LTE for voice for the non-deprioritized LTE frequency first. As a further example, when PLMN scan is stopped due to the T325 timer expiring and prioritization of NR is occurring, the radio manager may maintain prioritization of the NR RAT.

In some embodiments, when a VoIP call (e.g., a VoWi-Fi call) is active and a UE computing device determines a handover (HO) preparation condition for handover from WLAN to WWAN is met, a UE computing device may send a service request indicating voice EPS fallback to a 5G SA network. In some embodiments, the service request indicating voice EPS fallback may be sent in response to determining the UE computing device and/or the WWAN network (e.g., the 5G SA network) in which the UE computing device is located do not support VoNR. In some embodiments, HO preparation conditions may include the UE computing device being registered to the 5G SA network, such as in an idle or connected state, the UE computing device determining that the UE computing device does not support VoNR or the UE computing device determining the network does not support VoNR, and/or the UE computing device determining a WLAN and/or LTE signal condition is met (e.g., LTE signal strength being above a threshold when WWAN is preferred, WLAN quality being below a threshold when WLAN is preferred, etc.).

In some embodiments, upon receiving the service request indicating voice EPS fallback, the network may trigger EPS fallback, and VoWi-Fi call may continue on WLAN while EPS fallback is ongoing. In some embodiments, after EPS fallback is complete, the UE computing device may trigger IMS PDN handover from ePDG to LTE. In some embodiments, IMS PDN handover from ePDG to LTE may not be completed and the IMS PDN context may remain on WLAN and ePDG in response to the WLAN signal quality falling before handover is complete, an IMS real time transport (RTP) inactivity time expiring (e.g., a 20 second timer), a dead peer detection (DPD) protocol failure occurs, or a user ends the VoIP call.

As an example of a UE computing device triggering EPS fallback according to some embodiments, the UE computing device may send a UE initiated service request for EPS fallback for normal voice in response to handover preparation conditions being met. The UE computing device may have previously registered with a 5G SA and a VoWi-Fi call may be ongoing. The 5G SA may receive the UE initiated service request for EPS fallback for normal voice, such as at the Access and Mobility Management Function (AMF). In response to the UE initiated service request for EPS fallback for normal voice, the 5G SA may trigger the UE to switch from 5G SA to LTE (e.g., by directing the UE to perform EPS fallback via network redirection message to LTE or PSHO to LTE). The UE computing device may fall back to LTE and perform a TAU operation with an LTE cell and/or attach to the LTE cell. The UE and network may then perform operations together to achieve IMS PDN handover from ePDG to LTE of the VoWi-Fi call.

In some embodiments, a UE computing device may determine that VoNR is not supported based at least in part on determining that EPS fallback occurs while a voice call is active over a WLAN connection established by the UE computing device. In some scenarios, while a UE computing device is registered to a 5G SA network, the 5G SA network may start EPS fallback by triggering the UE to switch from 5G SA to LTE. For example, a 5G SA network may trigger EPS fallback when the 5G SA network does not support VoNR. In such embodiments, a UE may determine that EPS fallback is occurring based at least in part on receiving a redirection message to LTE or a PSHO to LTE while registered to a 5G SA network. In various embodiments, a UE computing device may prioritize an LTE RAT over a NR RAT in response to determining that EPS fallback occurs. As the NR RAT already experienced EPS fallback, further attempts at 5G SA connection establishment may also result in EPS fallback. The prioritization of LTE over NR after LTE fallback occurs while a voice call is active over a WLAN connection established by the UE computing device may enable the UE computing device to avoid an attempt at a 5G SA connection establishment that would likely result in LTE fallback occurring again, thereby avoiding unnecessary LTE fallback.

FIG. 1 illustrates an example of a communications system 100 that is suitable for implementing various embodiments. The communications system 100 may be an 5G NR network, or any other suitable network such as an LTE network.

The communications system 100 may include a heterogeneous network architecture that includes a core network 140 and a variety of UE) computing devices (illustrated as wireless device 120a-120e in FIG. 1). The communications system 100 may also include a number of base stations (illustrated as the BS 110a, the BS 110b, the BS 110c, and the BS 110d) and other network entities. A base station is an entity that communicates with UE computing devices, and also may be referred to as an NodeB, a Node B, an LTE evolved nodeB (eNB), an access point (AP), a radio head, a transmit receive point (TRP), a New Radio base station (NR BS), a 5G NodeB (NB), a Next Generation NodeB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, there) cells. The terms "eNB", "base station", "NR BS", "gNB", "TRP", "AP", "node B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network nodes (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e (UE computing device) may communicate with the base station 110a-110d over a wireless communication link 122.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (e.g., relay BS 110d). A relay station is an entity that can receive a transmission of data from an upstream station (for example, a base station or a mobile device) and send a transmission of the data to a downstream station (for example, a UE computing device or a base station). A relay station also may be a mobile device that can relay transmissions for other UE computing devices. In the example illustrated in FIG. 1, a relay station 110d may communicate with macro the base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices (UE computing devices) 120a, 120b, 120c may be dispersed throughout communications system 100, and each wireless device may be stationary or mobile. A wireless device also may be referred to as an access terminal, a UE, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122, 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links 122, 124 within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to eight transmit antennas with multi-layer DL transmissions up to eight streams and up to two streams per UE computing device. Multi-layer transmissions with up to 2 streams per UE computing device may be supported. Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband Internet of things) devices. A UE computing device (e.g., wireless device 120a-e) may be included inside a housing that houses components of the UE computing device, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

Figure 2:
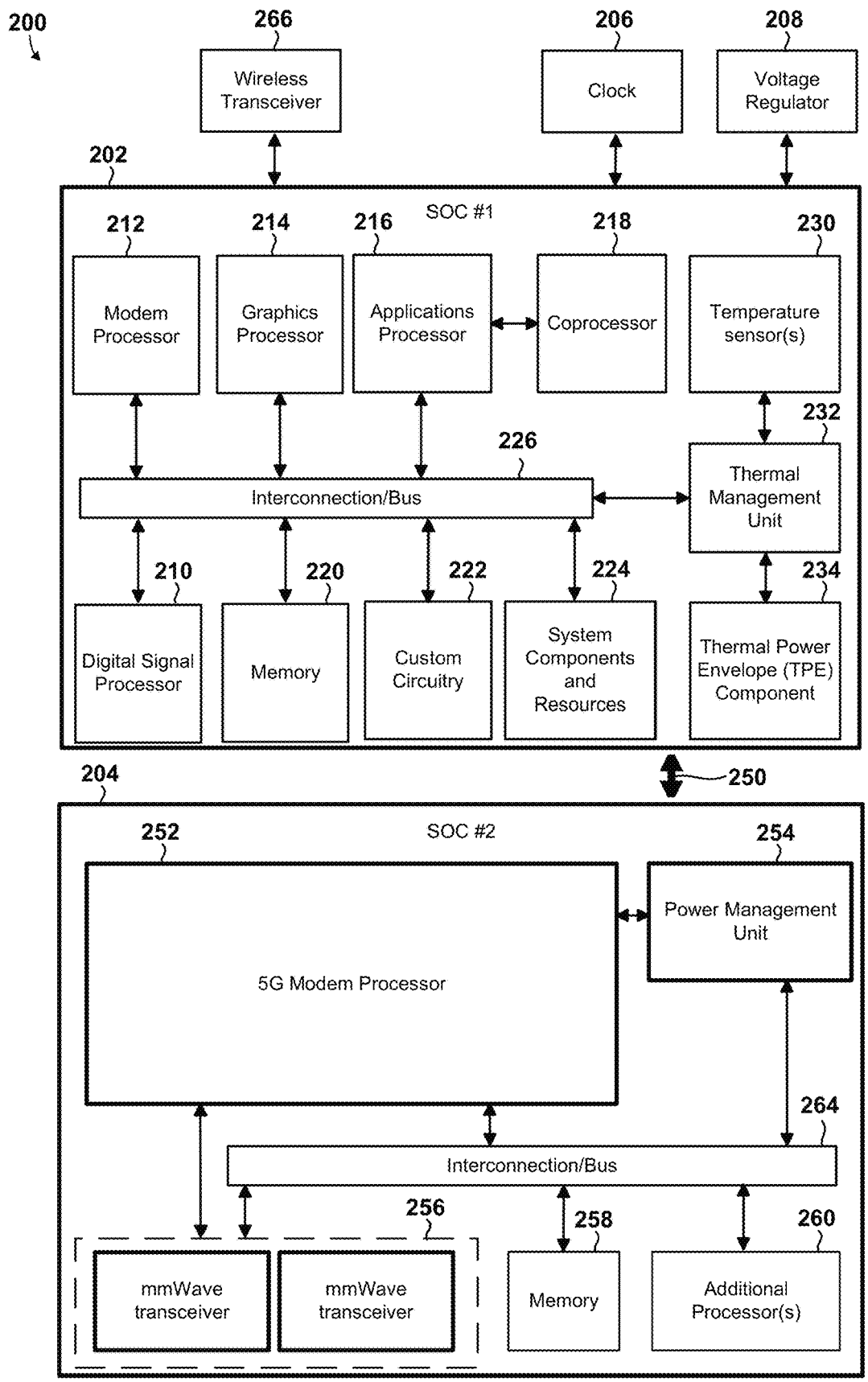
FIG. 2 is a component block diagram illustrating a computing system that may be configured to implement management of VoIP call handover in accordance with various embodiments.

In some implementations, two or more UE computing devices (for example, illustrated as the wireless device 120a and the wireless device 120e) may communicate directly using one or more sidelink channels 124 (for example, without using a base station 110a-110d as an intermediary to communicate with one another). For example, the wireless devices 120a-e may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120a-e may perform scheduling operations, resource selection operations, as well as other operations described elsewhere herein as being performed by the base station 110a Various embodiments may be implemented on a number of single processor and multiprocessor computer systems, including a system-on-chip (SOC) or system in a package (SIP). FIG. 2 illustrates an example computing system or SIP 200 architecture that may be used in UE computing devices implementing the various embodiments.

With reference to FIGS. 1 and 2, the illustrated example SIP 200 includes a two SOCs 202, 204, a clock 206, a voltage regulator 208 and a wireless transceiver 266. In some embodiments, the first SOC 202 operate as central processing unit (CPU) of the UE computing device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a UE computing device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
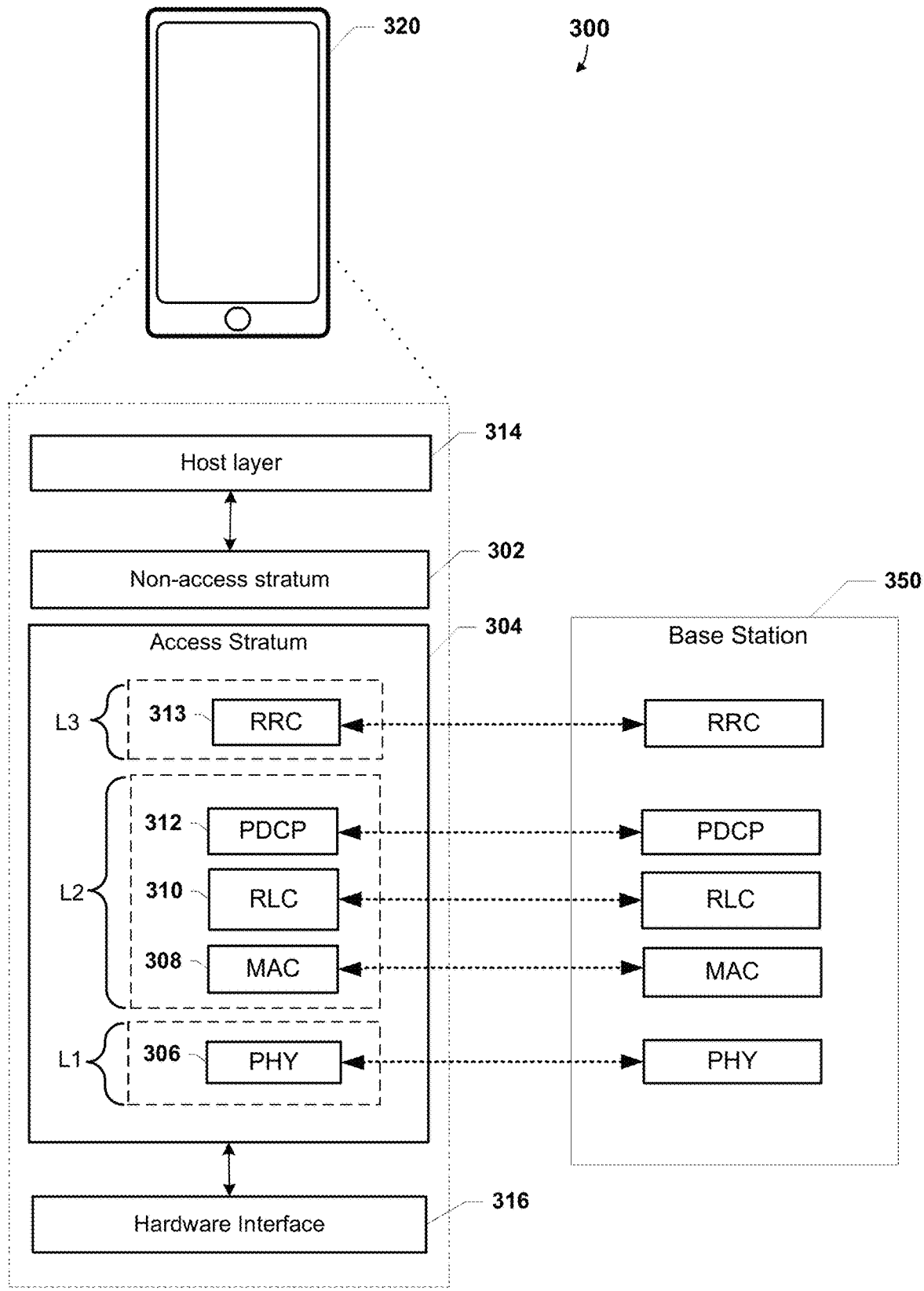
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 110a) and a UE computing device 320 (e.g., the wireless device 120a-120e, 200). With reference to FIGS. 1-3, the UE computing device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) UE computing device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the UE computing device (e.g., SIM(s) 204) and its core network 140. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the UE computing device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the UE computing device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the UE computing device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Figure 4:
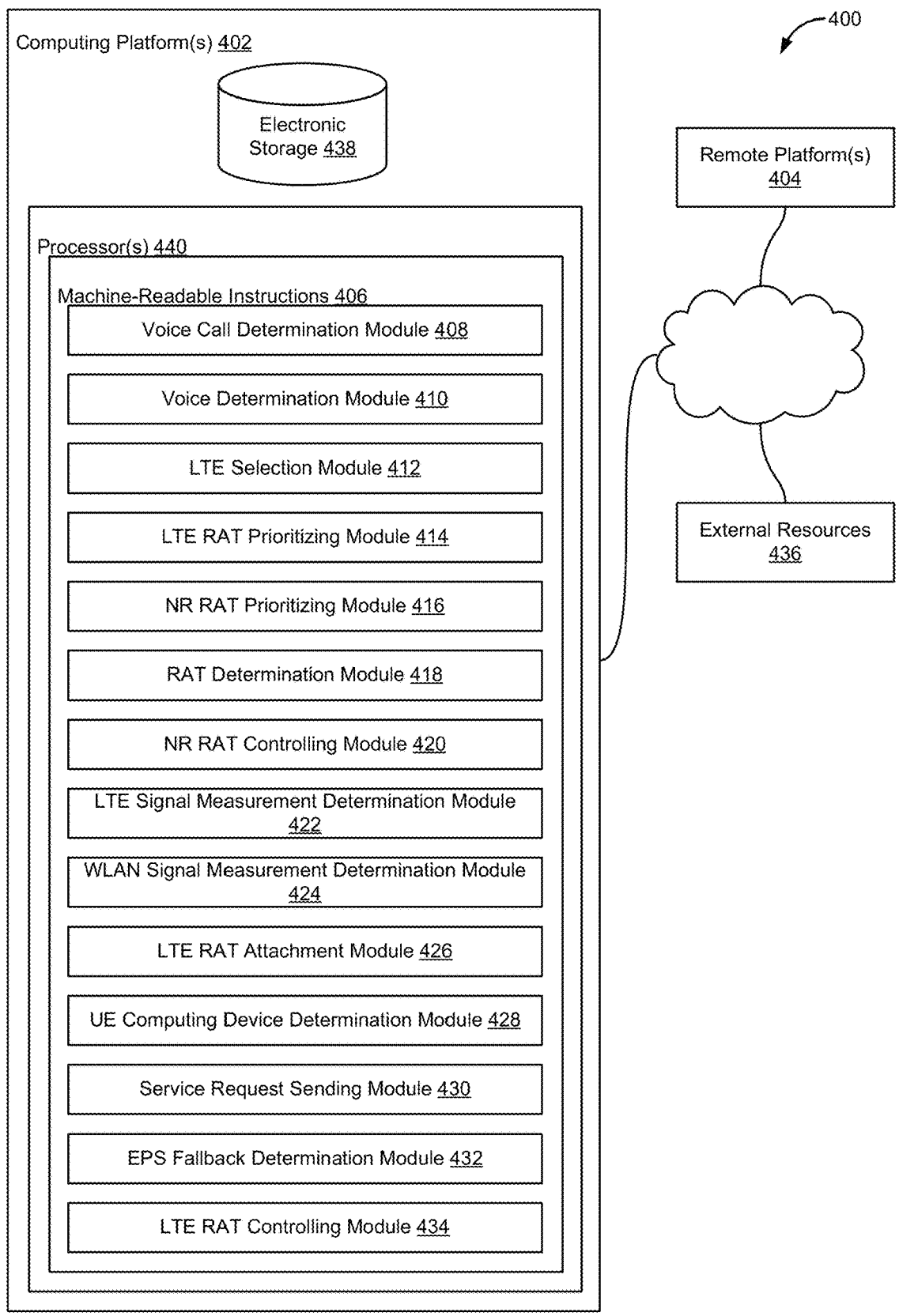
FIG. 4 is a component block diagram illustrating a system configured for supporting handover of a VoIP call in accordance with various embodiments.

FIG. 4 is a component block diagram illustrating a system 400 configured for supporting handover of a VoIP call, such as a VoIP call occurring while a UE computing device may be located in a 5G SA network coverage area, in accordance with various embodiments. In some embodiments, system 400 may include one or more computing platforms 402 and/or one or more remote platforms 404. With reference to FIGS. 1-4, computing platform(s) 402 may include a base station (e.g., the base station 110a-110d, 350) and/or a UE computing device (e.g., the wireless device 120a-120e, 200, 320). Remote platform(s) 404 may include a base station (e.g., the base station 110110a-110d, 350) and/or a UE computing device (e.g., the wireless device 120a-120e, 200, 320).

Computing platform(s) 402 may be configured by machine-readable instructions 406. Machine-readable instructions 406 may include one or more instruction modules. The instruction modules may include computer program modules. The instruction modules may include one or more of voice call determination module 408, voice determination module 410, LTE selection module 412, LTE RAT prioritizing module 414, NR RAT prioritizing module 416, RAT determination module 418, NR RAT controlling module 420, LTE signal measurement determination module 422, WLAN signal measurement determination module 424, LTE RAT attachment module 426, UE computing device determination module 428, service request sending module 430, EPS fallback determination module 432, LTE RAT controlling module 434, and/or other instruction modules.

Voice call determination module 408 may be configured to determine that a voice call is active over a wireless local area network (WLAN) connection established by the UE computing device. The WLAN connection may be a Wi-Fi connection. Voice call determination module 408 may be configured to determine that the voice call transferred to LTE or the voice call ended.

Voice determination module 410 may be configured to determine that VoNR is not supported in response to determining that the voice call is active over the WLAN connection established by the UE computing device. Voice determination module 410 may be configured to determine that VoNR is supported after prioritizing the LTE RAT over the NR RAT.

LTE selection module 412 may be configured to select LTE for handover of the voice call in response to determining that VoNR is not supported. The selecting LTE for handover of the voice call may cause the UE computing device to handover an IMS PDN connection established using the WLAN connection directly to an LTE connection without attempting to establish the IMS PDN connection with an available 5GS during the handover. Determining that VoNR may not be supported includes determining that the UE computing device does not support VoNR or determining that the 5G SA network does not support VoNR. The handover of the voice call to the LTE connection may be a handover of the IMS PDN connection from ePDG to LTE.

LTE RAT prioritizing module 414 may be configured to prioritize an LTE RAT over a NR RAT in response to determining that VoNR is not supported. LTE RAT prioritizing module 414 may be configured to prioritize an LTE RAT over a NR RAT in response to determining that the LTE signal measurement is above the quality threshold. LTE RAT prioritizing module 414 may be configured to prioritize an LTE RAT over a NR RAT in response to determining that the WLAN signal measurement is below the quality threshold.

NR RAT prioritizing module 416 may be configured to prioritize the NR RAT over the LTE RAT in response to determining that that the voice call transferred to LTE or the voice call ended. NR RAT prioritizing module 416 may be configured to prioritize the NR RAT over the LTE RAT in response to determining that VoNR is supported.

RAT determination module 418 may be configured to determine that NR RAT is in a connected state with the 5G SA network in response to prioritizing the LTE RAT over the NR RAT. RAT determination module 418 may be configured to determine that the NR RAT is in a connected state with the 5G SA network in response to prioritizing the LTE RAT over the NR RAT.

NR RAT controlling module 420 may be configured to control the NR RAT to stay in the connected state until the NR RAT moves to an idle state.

LTE signal measurement determination module 422 may be configured to determine whether an LTE signal measurement is above a quality threshold.

WLAN signal measurement determination module 424 may be configured to determine whether a WLAN signal measurement is below a quality threshold. WLAN signal measurement determination module 424 may be configured to determine whether a WLAN signal measurement is below a WLAN quality threshold or an LTE signal measurement is above an LTE quality threshold in response to determining that the UE computing device is registered to the 5G SA network.

LTE RAT attachment module 426 may be configured to attach the LTE RAT to an LTE cell after prioritizing an LTE RAT over a NR RAT.

UE computing device determination module 428 may be configured to determine whether the UE computing device is registered to the 5G SA network in response to determining that VoNR is not supported.

Service request sending module 430 may be configured to send a service request to trigger EPS fallback to the 5G SA network in response to determining that the WLAN signal measurement is below the WLAN quality threshold or the LTE signal measurement is above the LTE quality threshold.

EPS fallback determination module 432 may be configured to determine that EPS fallback is complete.

LTE RAT controlling module 434 may be configured to control an LTE RAT to handover the voice call to an LTE connection. For example, the handover of the voice call may be a handover of an IMS PDN connection from the ePDG to LTE.

Figure 5:
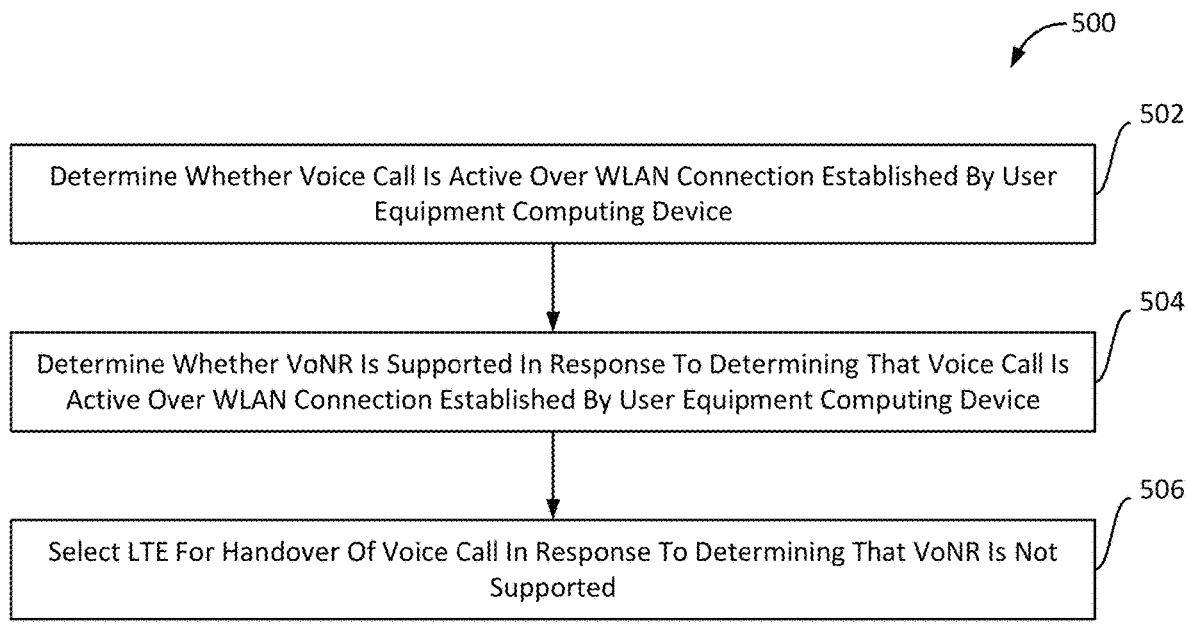
FIG. 5 is a process flow diagram illustrating a method for radio for supporting handover of a VoIP call in accordance with various embodiments.

FIG. 5 shows a process flow diagram of an example method 500 for supporting handover of a VoIP call, such as a VoIP call occurring while a UE computing device may be located in a 5G SA network coverage area, according to various embodiments. With reference to FIGS. 1-5, the method 500 may be implemented by a processor (such as 212, 216, 252 or 260) of a UE computing device (such as the wireless device 120a-120e, 200, 320).

In block 502, the processor may perform operations including determining whether a voice call is active over a WLAN connection established by the UE computing device. As an example, the WLAN connection may be a Wi-Fi connection and the voice call may be a VoIP call, such as a VoWi-Fi call. In various embodiments, the processor may determine that a voice call is active in various manners, such as in response to signaling that a voice call is established by the UE computing device.

In block 504, the processor may perform operations including determining whether VoNR is supported in response to determining that the voice call is active over the WLAN connection established by the UE computing device. In some embodiments, the UE computing device may not be configured to support VoNR. For example, the modem of the UE computing device may not support VoNR over a NR RAT. In some embodiments, the UE computing device may be capable of supporting VoNR, but the WWAN network the UE computing device is located in may not support VoNR. For example, the WWAN network may be a 5G SA network that does not support VoNR and requires VoIP calls to be made over LTE fallback. In some embodiments, the processor may determine that VoNR is not supported based on configuration settings on the UE computing device and/or based on network signaling, such as network signaling indicating LTE fallback is to be used for VoIP calls.

In block 506, the processor may perform operations including selecting LTE for handover of the voice call in response to determining that VoNR is not supported. In various embodiments, selecting LTE for handover of the voice call may include prioritizing LTE over NR and/or sending a request to the network from the UE computing device to initiate LTE fallback. In various embodiments, the handover of the voice call may be a handover of an IMS PDN connection from the ePDG to LTE. Various specific operations to select LTE for handover of the voice call are discussed with reference to FIGS. 6-18B.

Figure 6:
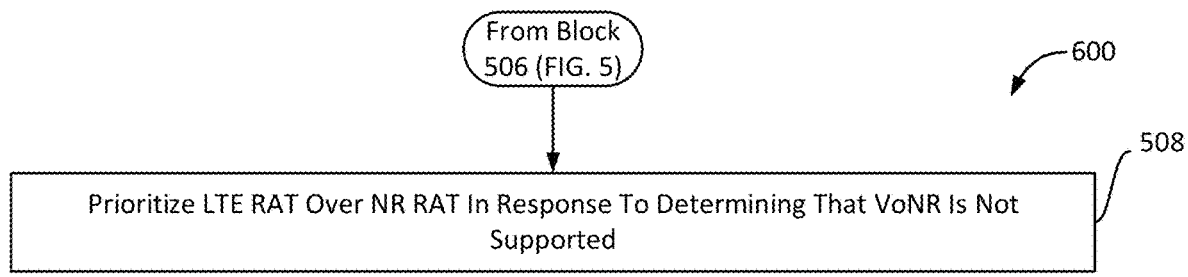
FIG. 6 is a process flow diagram illustrating a method for radio for supporting handover of a VoIP call in accordance with various embodiments.

FIG. 6 shows a process flow diagram of an example method 600 for supporting handover of a VoIP call, such as a VoIP call occurring while a UE computing device may be located in a 5G SA network coverage area, according to various embodiments. With reference to FIGS. 1-6, the method 600 may be implemented by a processor (such as 212, 216, 252 or 260) of a UE computing device (such as the wireless device 120a-120e, 200, 320). In various embodiments, the method 600 may be performed in conjunction with the operations of method 500 (FIG. 5). For example, the operations of method 600 may be performed as part of the operations for selecting LTE for handover of a voice call in block 506 (FIG. 5).

In block 508, the processor may perform operations including prioritizing an LTE RAT over a NR RAT in response to determining that VoNR is not supported. In some embodiments, an LTE prioritization state may be a state in which LTE is prioritized over NR by the UE computing device. In some embodiments, the LTE prioritization state may be implemented by adjusting values related to radio resource control (RRC) and/or non-access stratum (NAS) functions of the UE computing device, such as RRC and/or NAS values of a modem of the UE computing device. In some embodiments, the UE computing device may be configured to enter the LTE prioritization state in response to determining that a VoIP call (e.g., a VoWi-Fi) call is initiated on the UE computing device and the UE computing device (or the network) do not support VoNR. In some embodiments, radio manager application running on a processor of the UE computing device, such as a radio manager application running on a modem processor, etc., may control the UE computing device to enter the LTE prioritization state. In some embodiments, the radio manager may control a modem of the UE computing device such that in the LTE prioritization state the UE computing device may deprioritize NR.

Figure 7:
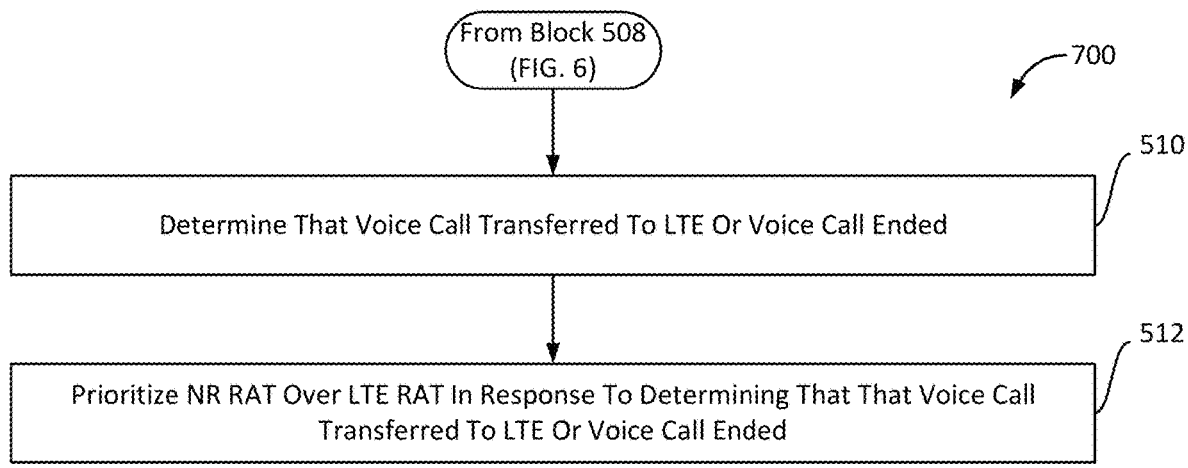
FIG. 7 is a process flow diagram illustrating a method for radio for supporting handover of a VoIP call in accordance with various embodiments.

FIG. 7 shows a process flow diagram of an example method 700 for supporting handover of a VoIP call, such as a VoIP call occurring while a UE computing device may be located in a 5G SA network coverage area, according to various embodiments. With reference to FIGS. 1-7, the method 700 may be implemented by a processor (such as 212, 216, 252 or 260) of a UE computing device (such as the wireless device 120a-120e, 200, 320). In various embodiments, the method 700 may be performed in conjunction with the operations of methods 500 (FIG. 5) and 600 (FIG. 6). For example, the operations of method 700 may be performed in response to prioritizing the LTE RAT in block 508 (FIG. 6).

In block 510, the processor may perform operations including determining that the voice call transferred to LTE or the voice call ended. For example, the processor may determine the call was successfully established over an LTE connection. As another example, the processor may determine a call termination indication was received, thereby ending the call.

In block 512, the processor may perform operations including prioritizing the NR RAT over the LTE RAT in response to determining that that the voice call transferred to LTE or the voice call ended. In some embodiments, the UE computing device may be configured to return from an LTE prioritization state to a normal state of operation in response to determining a voice call is no longer ongoing.

Figure 8:
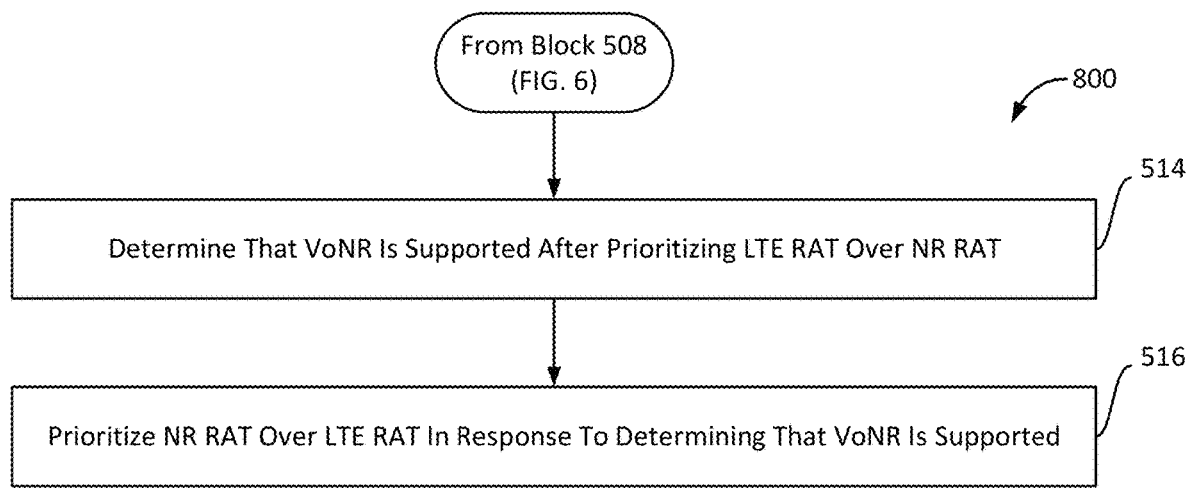
FIG. 8 is a process flow diagram illustrating a method for radio for supporting handover of a VoIP call in accordance with various embodiments.

FIG. 8 shows a process flow diagram of an example method 800 for supporting handover of a VoIP call, such as a VoIP call occurring while a UE computing device may be located in a 5G SA network coverage area, according to various embodiments. With reference to FIGS. 1-8, the method 800 may be implemented by a processor (such as 212, 216, 252 or 260) of a UE computing device (such as the wireless device 120a-120e, 200, 320). In various embodiments, the method 800 may be performed in conjunction with the operations of methods 500 (FIG. 5), 600 (FIG. 6), and 700 (FIG. 7). For example, the operations of method 800 may be performed in response to prioritizing the LTE RAT in block 508 (FIG. 6).

In block 514, the processor may perform operations including determining that VoNR is supported after prioritizing the LTE RAT over the NR RAT. For example, network signaling may indicate that VoNR is currently supported for the network.

In block 516, the processor may perform operations including prioritizing the NR RAT over the LTE RAT in response to determining that VoNR is supported. In this manner, the UE computing device may return to a normal state of operation in which NR is prioritized over LTE as VoNR is supported.

Figure 9:
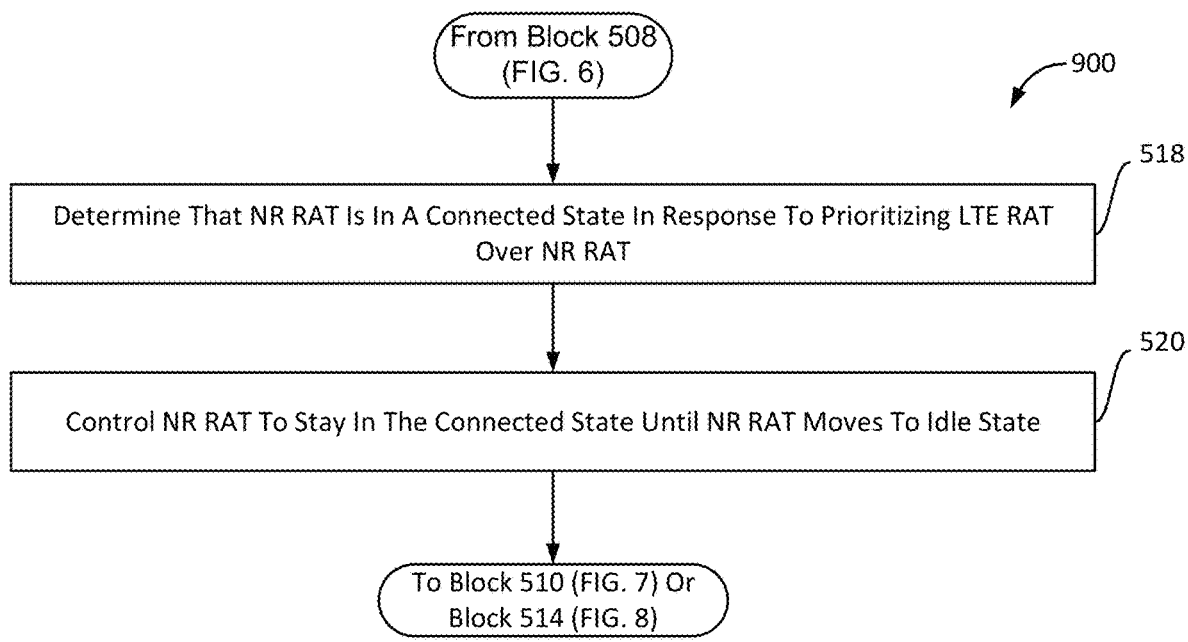
FIG. 9 is a process flow diagram illustrating a method for radio for supporting handover of a VoIP call in accordance with various embodiments.

FIG. 9 shows a process flow diagram of an example method 900 for supporting handover of a VoIP call, such as a VoIP call occurring while a UE computing device may be located in a 5G SA network coverage area, according to various embodiments. With reference to FIGS. 1-9, the method 900 may be implemented by a processor (such as 212, 216, 252 or 260) of a UE computing device (such as the wireless device 120a-120e, 200, 320). In various embodiments, the method 900 may be performed in conjunction with the operations of methods 500 (FIG. 5), 600 (FIG. 6), 700 (FIG. 7), and 800 (FIG. 8). For example, the operations of method 900 may be performed in response to prioritizing the LTE RAT in block 508 (FIG. 6).

In block 518, the processor may perform operations including determining that NR RAT is in a connected state with the 5G SA network in response to prioritizing the LTE RAT over the NR RAT. For example, the processor may perform operations including determining that NR RAT is actively connected to the 5G SA network in response to prioritizing the LTE RAT over the NR RAT. For example, a status indication of the UE computing device may indicate the NR RAT is in an active state.

In block 520, the processor may perform operations including controlling the NR RAT to stay in the connected state until the NR RAT moves to an idle state. For example, the processor may perform operations including controlling the NR RAT to stay connected to the 5G SA network until the NR RAT moves to an idle state. In some embodiments, the UE computing device may stay connected on 5G NR despite LTE being prioritized over NR. For example, when the UE computing device is in connected on 5G SA while the LTE priority is changed to be higher than NR, the UE computing device may stay on 5G SA until the UE computing device moves to an idle state.

Figure 10A:
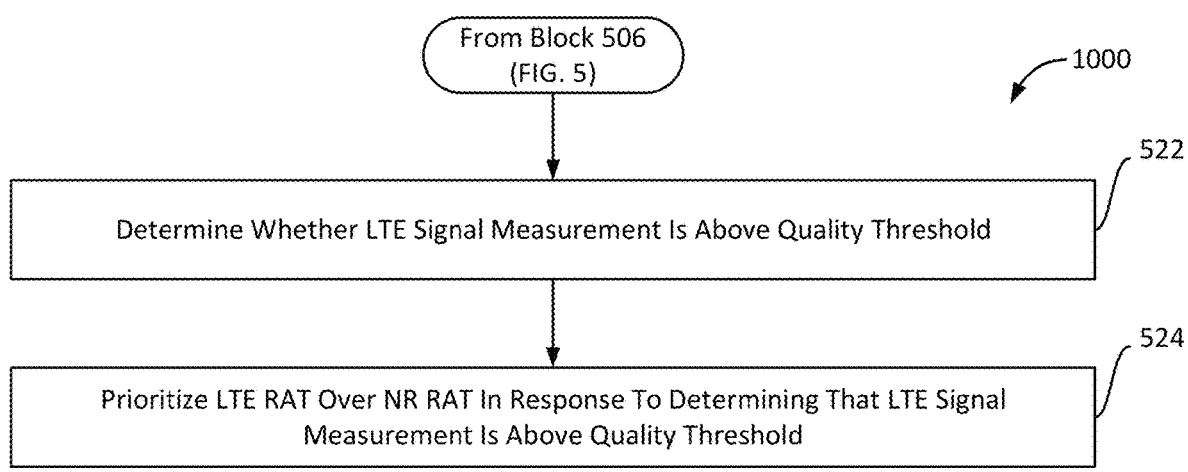
FIG. 10A is a process flow diagram illustrating a method for radio for supporting handover of a VoIP call in accordance with various embodiments.

FIG. 10A shows a process flow diagram of an example method 1000 for supporting handover of a VoIP call, such as a VoIP call occurring while a UE computing device may be located in a 5G SA network coverage area, according to various embodiments. With reference to FIGS. 1-10A, the method 1000 may be implemented by a processor (such as 212, 216, 252 or 260) of a UE computing device (such as the wireless device 120a-120e, 200, 320). In various embodiments, the method 1000 may be performed in conjunction with the operations of methods 500 (FIG. 5), 600 (FIG. 6), 700 (FIG. 7), 800 (FIG. 8), and 900 (FIG. 9). For example, the operations of method 1000 may be performed as part of the operations for selecting LTE for handover of a voice call in block 506 (FIG. 5).

In block 522, the processor may perform operations including determining whether an LTE signal measurement is above a quality threshold. For example, the processor may determine an LTE signal strength and compare that LTE signal strength to a set quality threshold value.

In block 524, the processor may perform operations including prioritizing an LTE RAT over a NR RAT in response to determining that the LTE signal measurement is above the quality threshold. In some embodiments, in response to determining an LTE signal measurement is above a quality threshold, the UE computing device may be configured to enter the LTE prioritization state. As one example, when IMS is set such that WWAN is preferred and the LTE signal strength rise above a quality threshold value, the UE computing device may enter the LTE prioritization state.

Figure 10B:
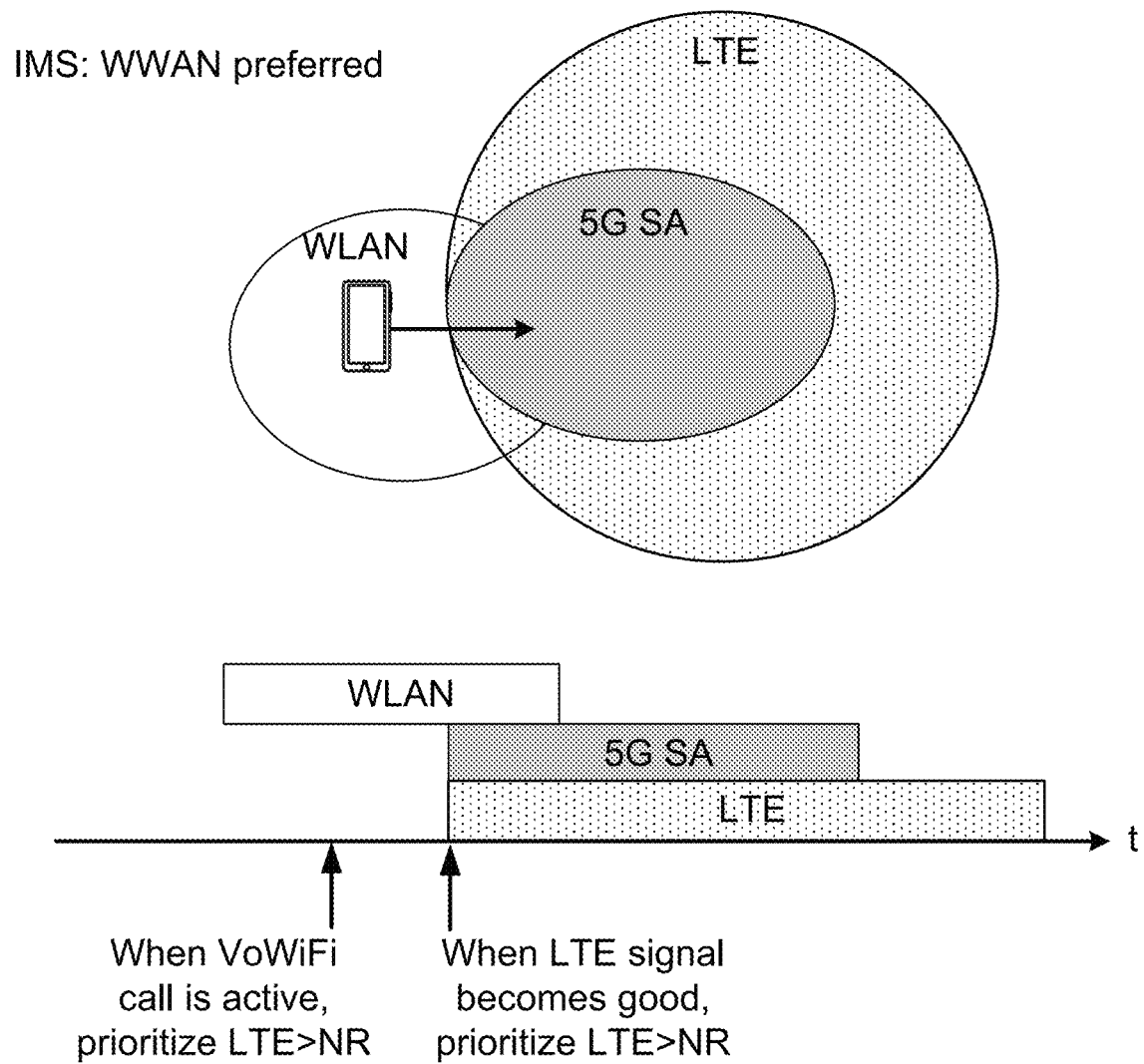
FIG. 10B is a notional diagram illustrating triggers for prioritizing LTE in the case in which WWAN service is preferred in accordance with some embodiments.

FIG. 10B is a notional diagram illustrating triggers for prioritizing LTE in the case in which WWAN service is preferred in accordance with some embodiments. With reference to FIGS. 1-10B, a UE computing device may be in coverage of a WLAN (e.g., in a WLAN coverage area) for a first period of time. While transiting from a first point to a second point over time, the UE computing device may move from a point in WLAN coverage to a point covered by WLAN, 5G SA (e.g., a 5G SA coverage area), and LTE (e.g., an LTE coverage area). In some embodiments, at a time a VoWi-Fi call becomes active, the UE computing device may prioritize LTE over NR. In some embodiments, at a time the LTE signal becomes good (e.g., above a quality threshold), the UE computing device may prioritize LTE over NR.

Figure 11A:
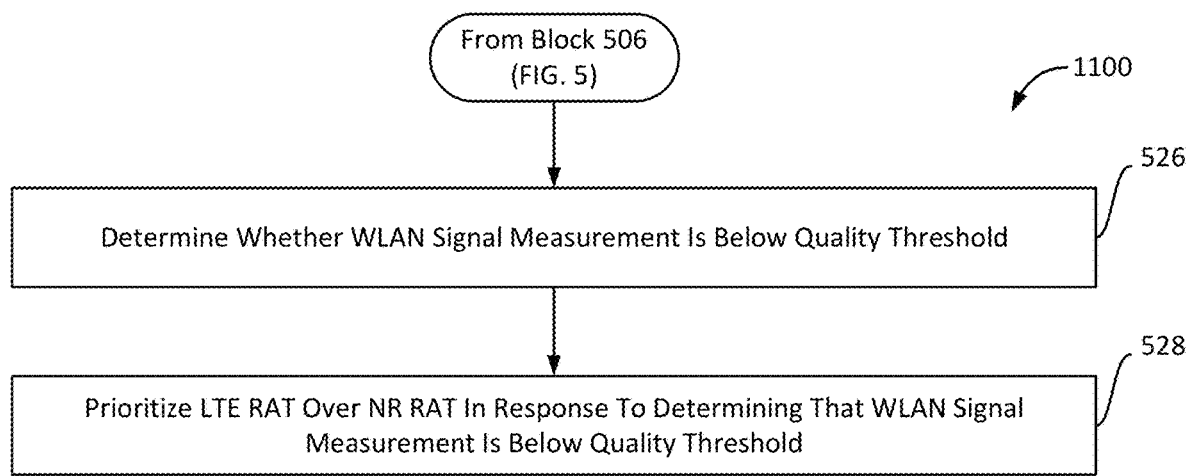
FIG. 11A is a process flow diagram illustrating a method for radio for supporting handover of a VoIP call in accordance with various embodiments.

FIG. 11A shows a process flow diagram of an example method 1100 for supporting handover of a VoIP call, such as a VoIP call occurring while a UE computing device may be located in a 5G SA network coverage area, according to various embodiments. With reference to FIGS. 1-11A, the method 1100 may be implemented by a processor (such as 212, 216, 252 or 260) of a UE computing device (such as the wireless device 120a-120e, 200, 320). In various embodiments, the method 1100 may be performed in conjunction with the operations of methods 500 (FIG. 5), 600 (FIG. 6), 700 (FIG. 7), 800 (FIG. 8), 900 (FIG. 9), and 1000 (FIG. 10A). For example, the operations of method 1100 may be performed as part of the operations for selecting LTE for handover of a voice call in block 506 (FIG. 5).

In block 526, the processor may perform operations including determining whether a WLAN signal measurement is below a quality threshold. For example, the processor may determine WLAN quality measurement and compare that WLAN quality measurement to a set quality threshold value.

In block 528, the processor may perform operations including prioritizing an LTE RAT over a NR RAT in response to determining that the WLAN signal measurement is below the quality threshold. In some embodiments, in response to determining a WLAN signal measurement is below a quality threshold, the UE computing device may be configured to enter the LTE prioritization state. As one example, when IMS is set to WLAN preferred (e.g., Wi-Fi preferred) and WLAN quality (e.g., Wi-Fi quality) becomes unsuitable (e.g., the WLAN quality may be unsuitable when the WLAN packet error rate (e.g., a high error rate) and/or the WLAN signal strength (e.g., a low signal strength) indicate the WLAN quality is below a threshold set for acceptable for voice and/or video services), the UE computing device may be configured to enter the LTE prioritization state.

Figure 11B:
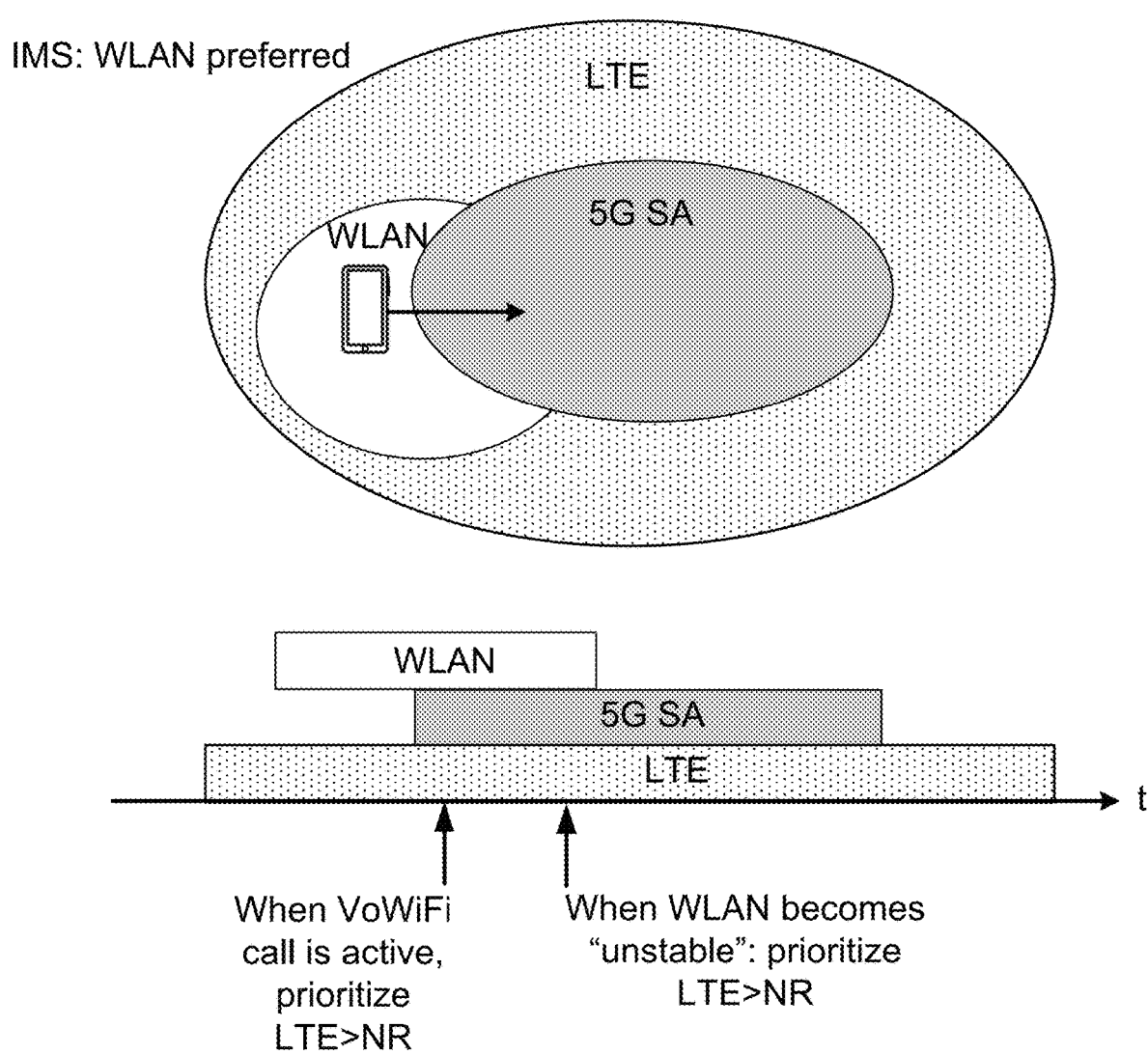
FIG. 11B is a notional diagram illustrating triggers for prioritizing LTE in the case in which WLAN service is preferred in accordance with some embodiments.

FIG. 11B is a notional diagram illustrating triggers for prioritizing LTE in the case in which WLAN service is preferred in accordance with some embodiments. With reference to FIGS. 1-11B, a UE computing device may be in coverage of a WLAN (e.g., a WLAN coverage area) and an LTE network (e.g., an LTE coverage area) for a first period of time. While transiting from a first point to a second point over time, the UE computing device may move from a point in WLAN and LTE coverage to a point covered by 5G SA (e.g., a 5G SA coverage area) and LTE. In some embodiments, at a time a VoWi-Fi call becomes active, the UE computing device may prioritize LTE over NR. In some embodiments, at a time the WLAN signal becomes unstable (e.g., below a quality threshold), the UE computing device may prioritize LTE over NR.

Figure 12:
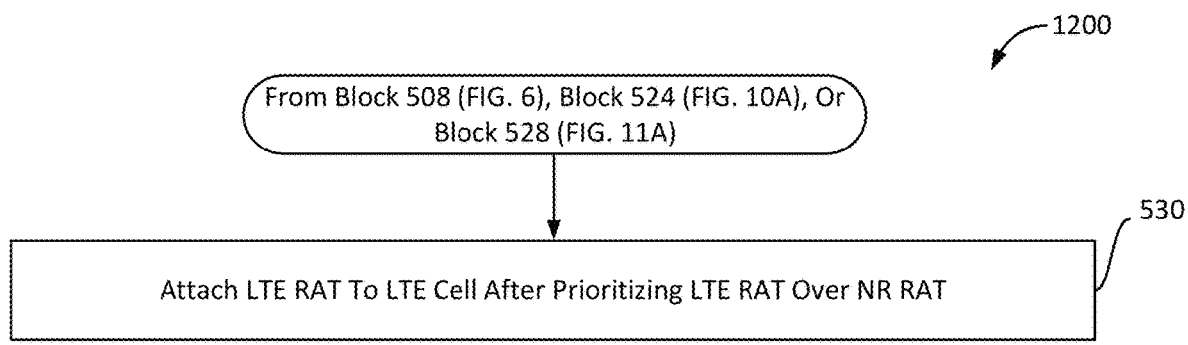
FIG. 12 is a process flow diagram illustrating a method for radio for supporting handover of a VoIP call in accordance with various embodiments.

FIG. 12 shows a process flow diagram of an example method 1200 for supporting handover of a VoIP call, such as a VoIP call occurring while a UE computing device may be located in a 5G SA network coverage area, according to various embodiments. With reference to FIGS. 1-12, the method 1200 may be implemented by a processor (such as 212, 216, 252 or 260) of a UE computing device (such as the wireless device 120a-120e, 200, 320). In various embodiments, the method 1100 may be performed in conjunction with the operations of methods 500 (FIG. 5), 600 (FIG. 6), 700 (FIG. 7), 800 (FIG. 8), 900 (FIG. 9), 1000 (FIG. 10A), and 1100 (FIG. 11A). For example, the operations of method 1200 may be performed in response to prioritizing the LTE RAT in block 508 (FIG. 6), block 524 (FIG. 10A), and/or block 528 (FIG. 11A).

In block 530, the processor may perform operations including attaching the LTE RAT to an LTE cell after prioritizing an LTE RAT over a NR RAT. In some embodiments, in the LTE prioritization state, the UE computing device may attach to an LTE cell. The UE computing device attaching to the LTE cell may be an LTE attached substate of the LTE prioritization state. In this LTE attached substate, the UE computing device may stay on LTE and be ready for VoWi-Fi call handover from WLAN to LTE. In the LTE attached substate, the UE computing device may ignore redirection requests received after attaching to the LTE cell as part of prioritizing the LTE RAT.

Figure 13:
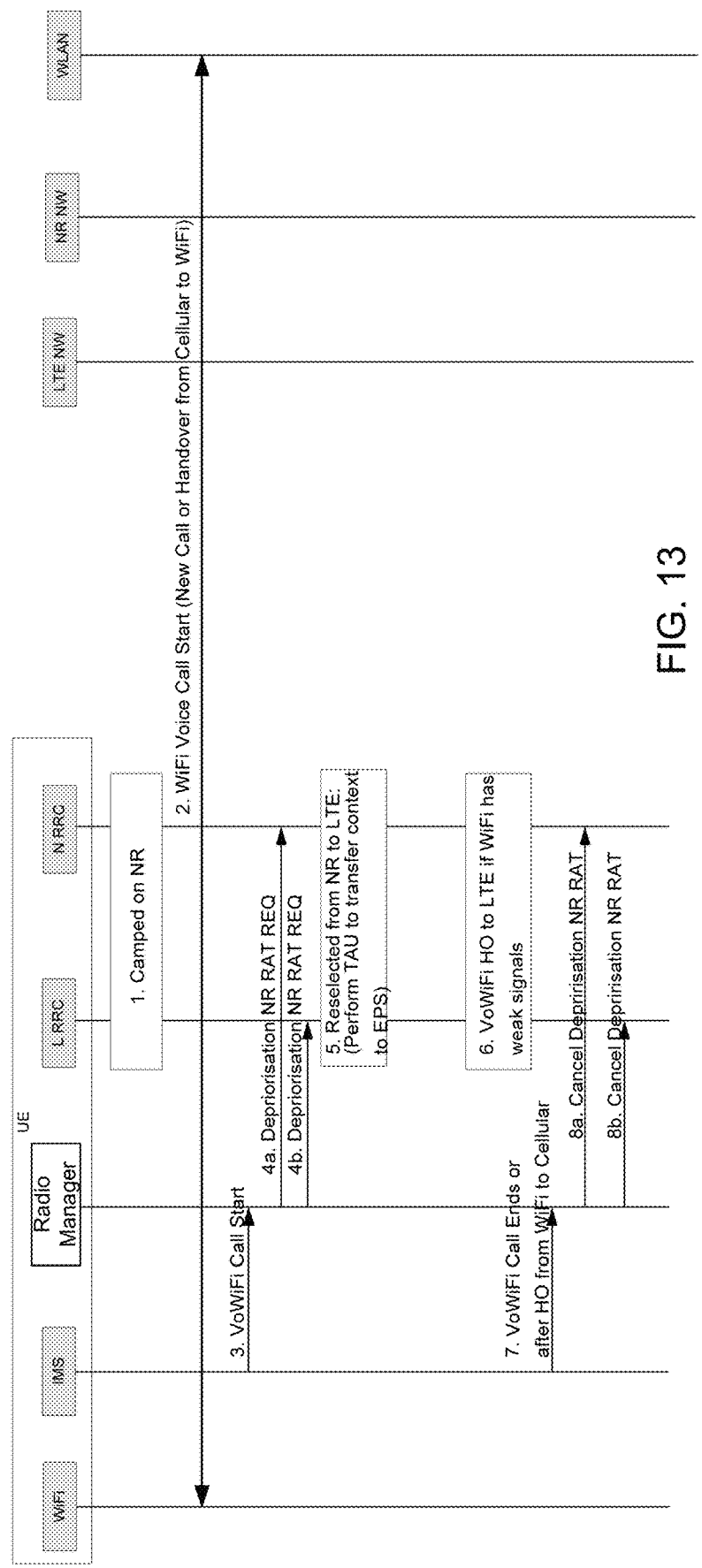
FIG. 13 is a call flow diagram illustrating various operations for supporting handover of a VoIP call in accordance with various embodiments.

FIG. 13 is a call flow diagram illustrating various operations for supporting handover of a VoIP call in a 5G SA network in accordance with various embodiments. With reference to FIGS. 1-13, in operation 1, the UE may be camped on NR. In operations 2 and 3, a VoWi-Fi call may start. The call may be a new VoWi-Fi call or a handover call from cellular to Wi-Fi. In operations 4a and 4b, the radio manager may deprioritize the NR RAT. In some embodiments, the operations 4a and 4b may be combined if the LTE RRC forwards messages to the NR RRC. In operation 5, the UE computing device may reselect from NR to LTE. In operation 6, the VoWi-Fi call may handover to LTE if the Wi-Fi signal weakens below a threshold. In operation 7, the VoWi-Fi call may end or be handed over to cellular. Upon the call end or handover to cellular, the radio manager may cancel prioritization of the NR RAT in operations 8a and 8b. In some embodiments, the operations 8a and 8b may be combined if the LTE RRC forwards messages to the NR RRC.

Figure 14:
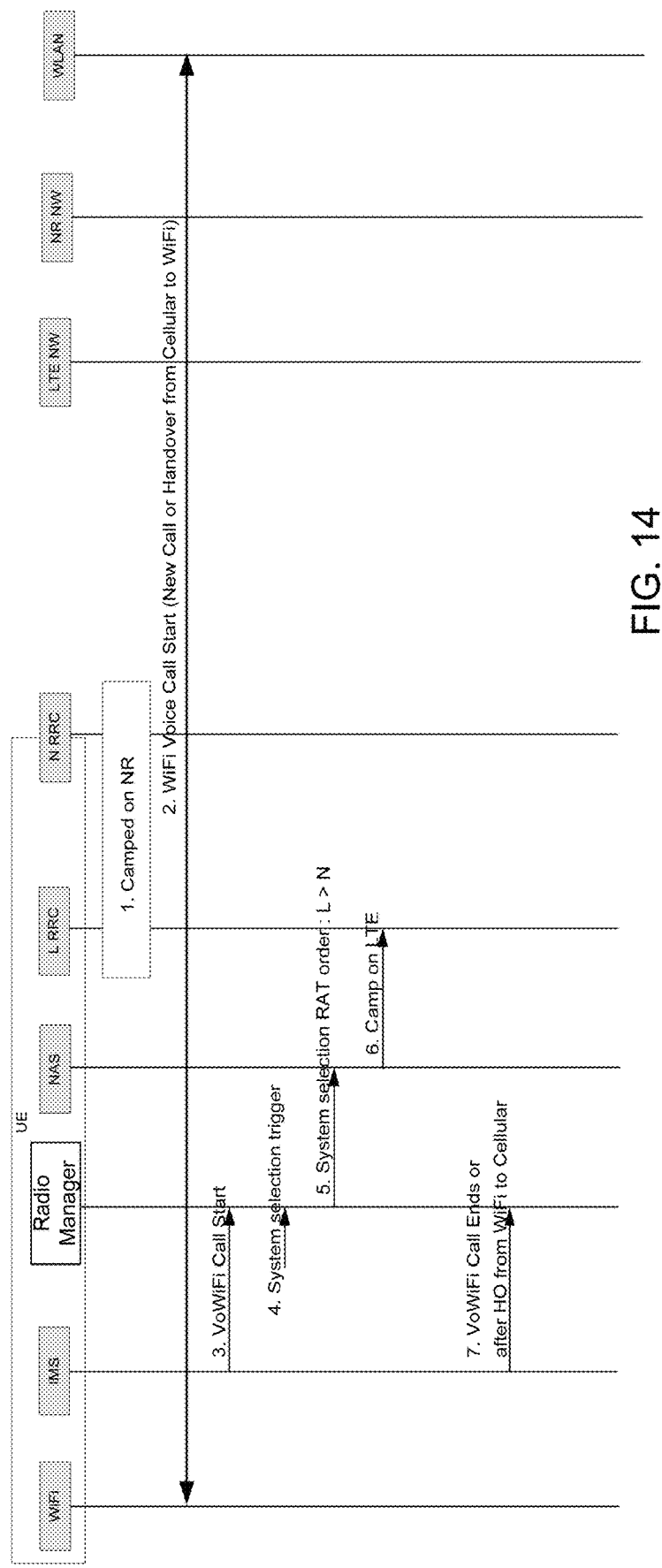
FIG. 14 is a call flow diagram illustrating various operations for supporting handover of a VoIP call in accordance with various embodiments.

FIG. 14 is a call flow diagram illustrating various operations for supporting handover of a VoIP call in a 5G SA network in accordance with various embodiments. With reference to FIGS. 1-14, in operation 1, the UE may be camped on NR. In operations 2 and 3, a VoWi-Fi call may start. The call may be a new VoWi-Fi call or a handover call from cellular to Wi-Fi. In operation 4, a system selection trigger may be received by the radio manager. In operation 5 the radio manager may set the system selection such that the RAT order has LTE prioritized over NR. In operation 6, the UE may camp on LTE. In operation 7, the VoWi-Fi call may end or be handed over to cellular.

Figure 15:
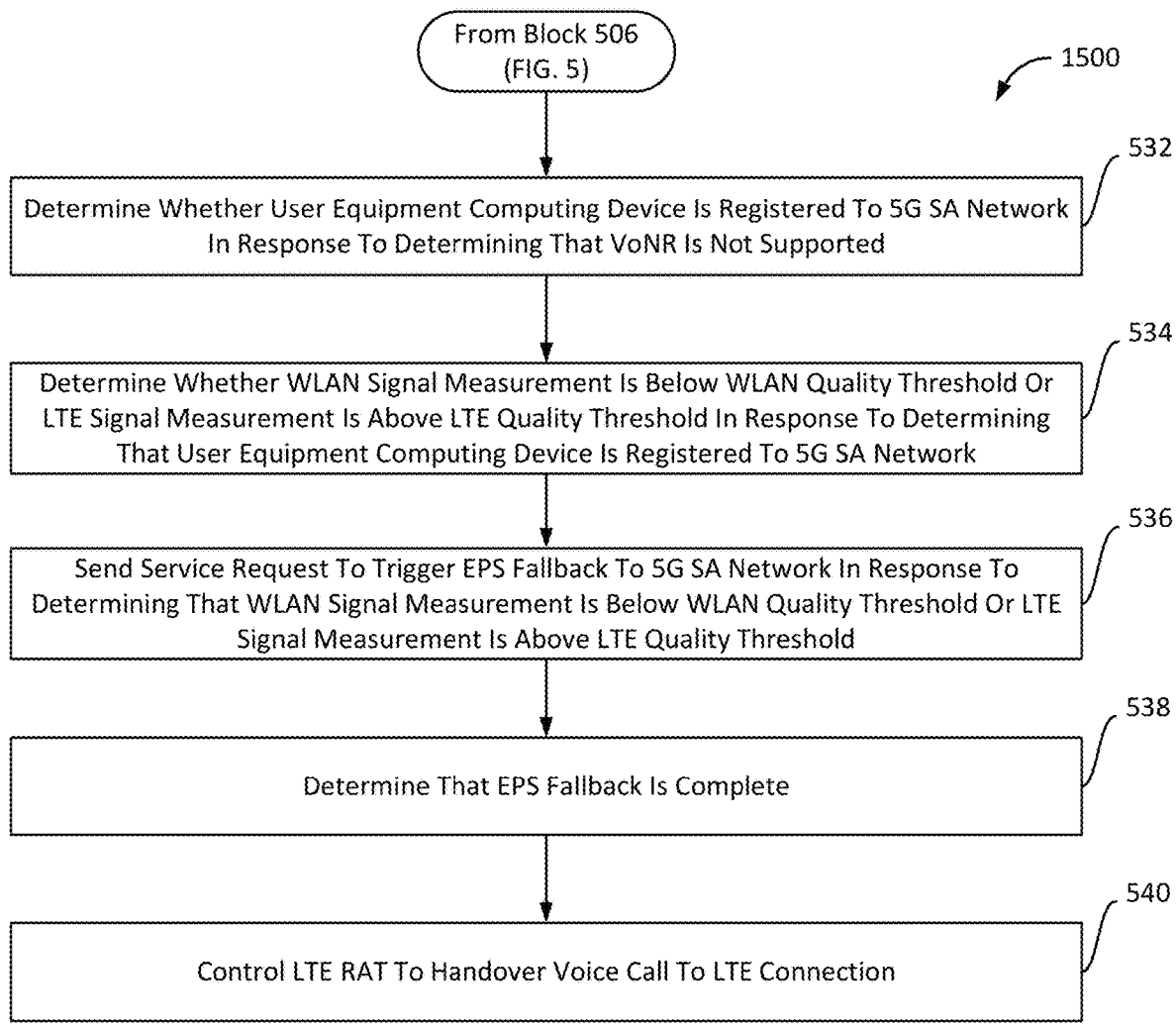
FIG. 15 is a process flow diagram illustrating a method for radio for supporting handover of a VoIP call in accordance with various embodiments.

FIG. 15 shows a process flow diagram of an example method 1500 for supporting handover of a VoIP call, such as a VoIP call occurring while a UE computing device may be located in a 5G SA network coverage area, according to various embodiments. With reference to FIGS. 1-15, the method 1500 may be implemented by a processor (such as 212, 216, 252 or 260) of a UE computing device (such as the wireless device 120*a*-120*e*, 200, 320). In various embodiments, the method 1500 may be performed in conjunction with the operations of method 500 (FIG. 5). For example, the operations of method 1500 may be performed as part of the operations for selecting LTE for handover of a voice call in block 506 (FIG. 5).

In block 532, the processor may perform operations including determining whether the UE computing device is registered to the 5G SA network in response to determining that VoNR is not supported. For example, the processor may determine whether the UE computing device is registered with the 5G SA in an idle or connected state.

In block 534, the processor may perform operations including determining whether a WLAN signal measurement is below a WLAN quality threshold or an LTE signal measurement is above an LTE quality threshold in response to determining that the UE computing device is registered to the 5G SA network. For example, the processor may determine whether the LTE signal strength is above a threshold when WWAN is preferred and whether the WLAN quality is below a threshold when WLAN is preferred.

In block 536, the processor may perform operations including sending a service request to trigger EPS fallback to the 5G SA network in response to determining that the WLAN signal measurement is below the WLAN quality threshold or the LTE signal measurement is above the LTE quality threshold. In some embodiments, the service request to trigger EPS fallback may be a service request indicating voice EPS fallback. The service request may be an indication to the network to immediately start EPS fallback by the network triggering the UE to switch from 5G SA to LTE (e.g., by directing the UE to perform EPS fallback via network redirection message to LTE or PSHO to LTE).

In block 538, the processor may perform operations including determining that EPS fallback is complete. In some embodiments, EPS fallback may be complete when the TAU operations are complete and/or the UE is attached to an LTE cell or camped on LTE.

In block 540, the processor may perform operations including controlling an LTE RAT to handover the voice call to an LTE connection.

Figure 16:
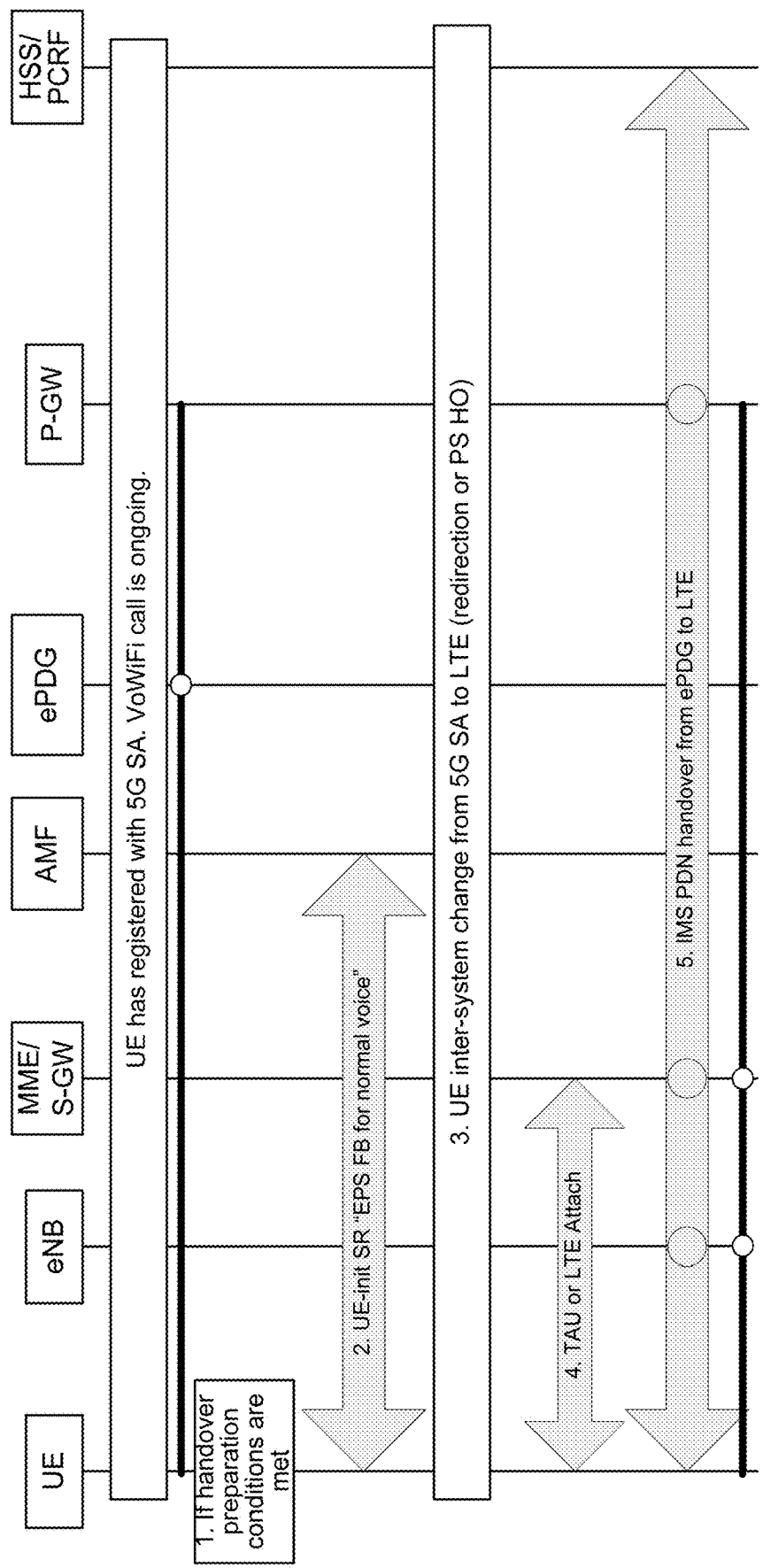
FIG. 16 is a call flow diagram illustrating various operations for supporting handover of a VoIP call in accordance with various embodiments.

FIG. 16 is a call flow diagram illustrating various operations for supporting handover of a VoIP call in a 5G SA network in accordance with various embodiments. With reference to FIGS. 1-16, the UE computing device may have previously registered with a 5G SA and a VoWi-Fi call may be ongoing. In operation 1, the UE may determine the handover conditions are met for handover from WLAN to LTE. In operation 2, the 5G SA may receive the UE initiated service request for EPS fallback for normal voice, such as at the AMF. In response to the UE initiated service request for EPS fallback for normal voice, in operation 3 the 5G SA may trigger the UE to switch from 5G SA to LTE (e.g., by directing the UE to perform EPS fallback via network redirection message to LTE or PSHO to LTE). The UE computing device may fall back to LTE and perform a TAU operation with an LTE cell and/or attach to the LTE cell in operation 4. The UE and network may then perform operations together to achieve IMS PDN handover from ePDG to LTE of the VoWi-Fi call in operation 5.

Figure 17:
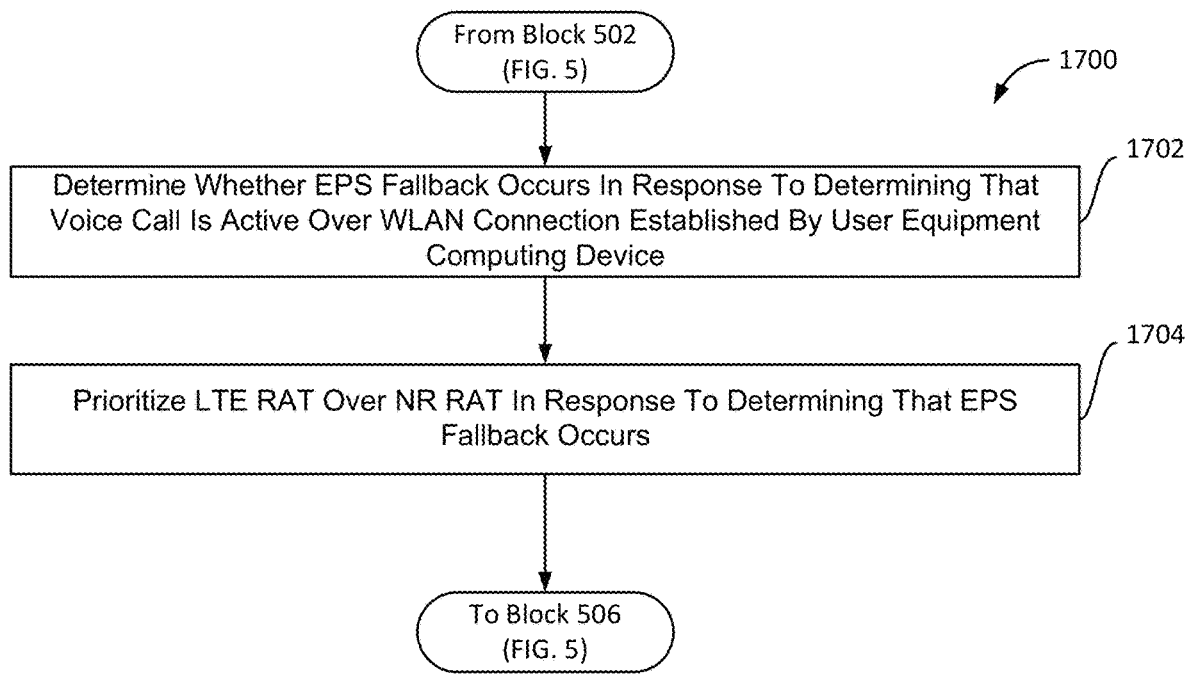
FIG. 17 is a process flow diagram illustrating a method for radio for supporting handover of a VoIP call in accordance with various embodiments.

FIG. 17 shows a process flow diagram of an example method 1700 for supporting handover of a VoIP call, such as a VoIP call occurring while a UE computing device may be located in a 5G SA network coverage area, according to some embodiments. With reference to FIGS. 1-17, the method 1700 may be implemented by a processor (such as 212, 216, 252 or 260) of a UE computing device (such as the wireless device 120*a*-120*e*, 200, 320). In such embodiments, the method 1700 may be performed in conjunction with the operations of the method 500 (FIG. 5). For example, the operations of the method 1500 may be performed as part of the operations for determining that VoNR is not supported in block 504 (FIG. 5).

In block 1702, the processor may perform operations including determining whether EPS fallback occurs in response to determining that the voice call is active over the WLAN connection established by the UE computing device. While a UE is registered to a 5G SA network, the 5G SA network may start EPS fallback by triggering the UE to switch from 5G SA to LTE. For example, a 5G SA network may trigger EPS fallback when the 5G SA network does not support VoNR. In such embodiments, a UE may determine that EPS fallback is occurring based at least in part on receiving a redirection message to LTE or a PSHO to LTE while registered to a 5G SA network. EPS fallback occurring while a voice call is active over a WLAN connection established by the UE computing device may be an indication that VoNR is not supported. EPS fallback may be complete when the TAU operations are complete and/or the UE is attached to an LTE cell or camped on LTE.

In block 1704, the processor may perform operations including prioritizing an LTE RAT over a NR RAT in response to determining that EPS fallback occurs. In some embodiments, an LTE prioritization state may be a state in which LTE is prioritized over NR by the UE computing device. In some embodiments, the LTE prioritization state may be implemented by adjusting values related to RRC and/or NAS functions of the UE computing device, such as RRC and/or NAS values of a modem of the UE computing device. In some embodiments, a radio manager application running on a processor of the UE computing device, such as a radio manager application running on a modem processor, etc., may control the UE computing device to enter the LTE prioritization state. In some embodiments, the radio manager may control a modem of the UE computing device such that in the LTE prioritization state the UE computing device may deprioritize NR.

In response to prioritizing an LTE RAT over a NR RAT, the processor may perform the operations of block 506 of the method 500 (FIG. 5) to select LTE for handover of the voice call as described.

Figure 18A:
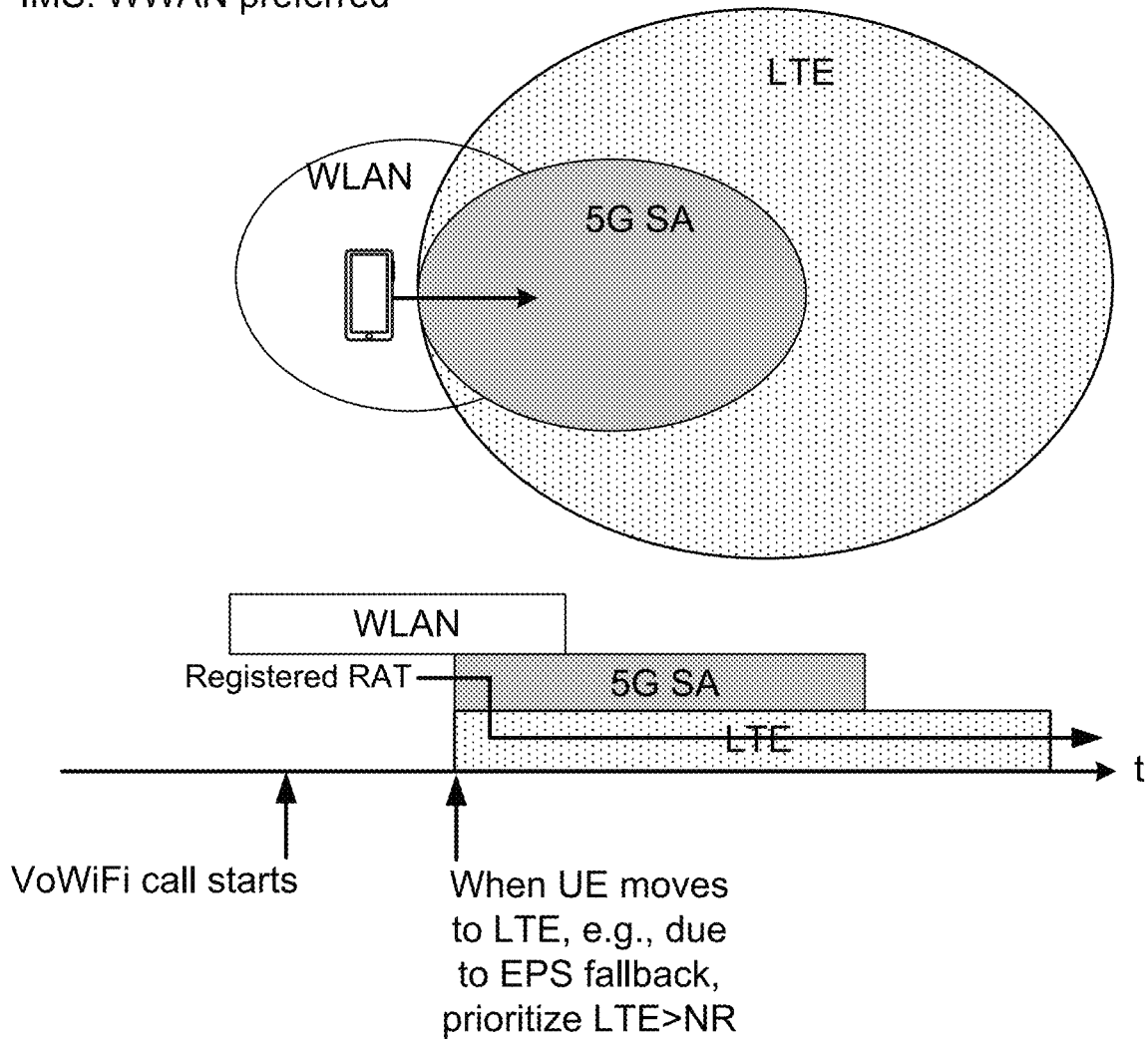
FIG. 18A is a notional diagram illustrating triggers for prioritizing LTE in the case in which WWAN service is preferred in accordance with some embodiments.

FIG. 18A is a notional diagram illustrating triggers for prioritizing LTE in the case in which WWAN service is preferred in accordance with the embodiment method 1700 (FIG. 17). With reference to FIGS. 1-18A, a UE computing device may be in coverage of a WLAN (e.g., in a WLAN coverage area) for a first period of time when a Vo/WiFi call starts. While transiting from a first point in a WLAN to a second point over time during the VoWiFi call, the UE computing device may move from a point in WLAN coverage to a point covered by WLAN, 5G SA (e.g., a 5G SA coverage area), and LTE (e.g., an LTE coverage area). In response, the UE computing device may register with a RAT for WWAN service as the IMS setting prefers WWAN service over WLAN service. If the UE computing device registers with a 5G SA network and that network does not support a voice call (e.g., VoNR), the 5G SA network may start EPS fallback by triggering the UE to switch from 5G SA to LTE to maintain the voice call on LTE. In the embodiment method 1700 (FIG. 17), when this happens the UE computing device may prioritize LTE over NR.

Figure 18B:
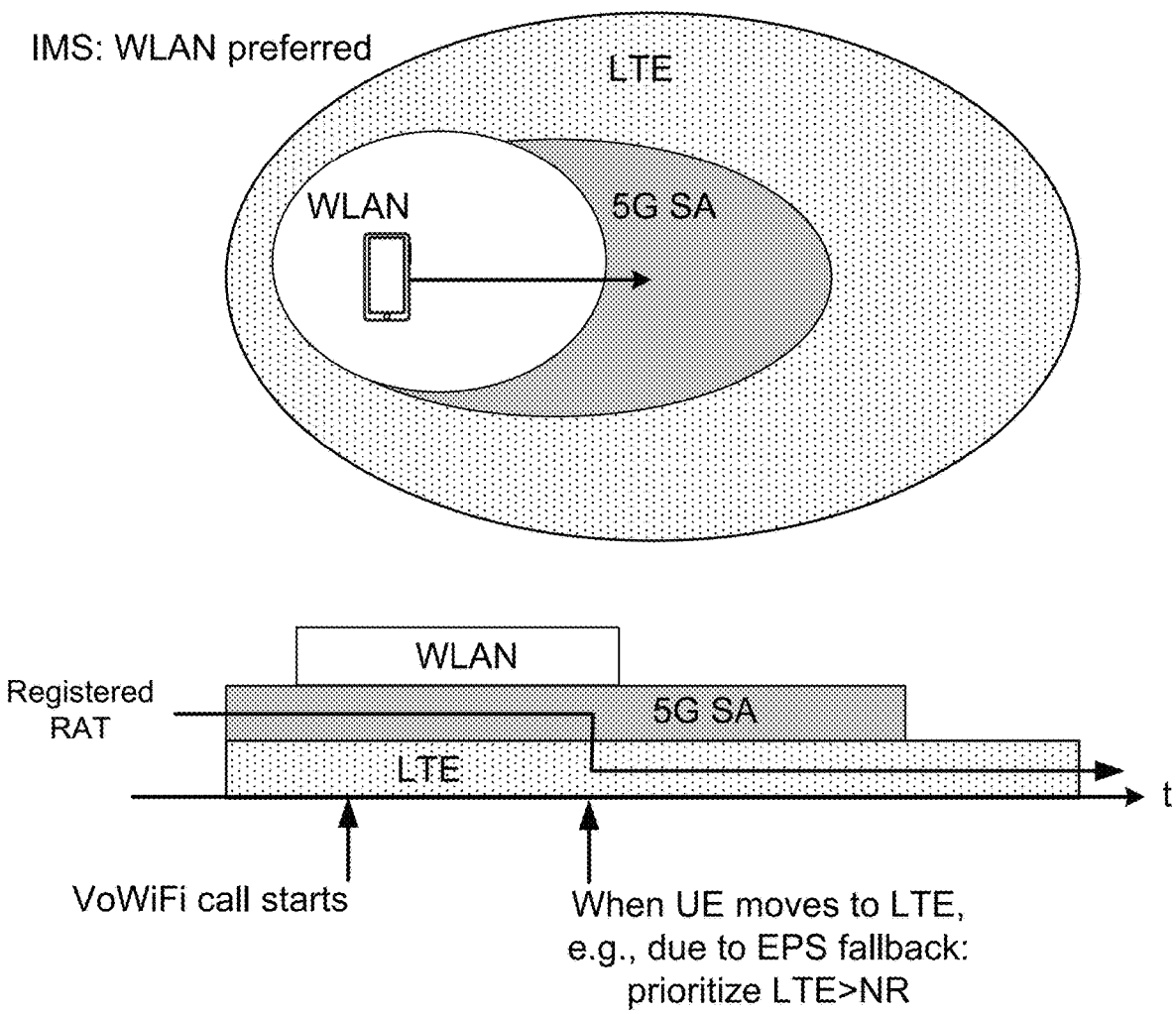
FIG. 18B is a notional diagram illustrating triggers for prioritizing LTE in the case in which WLAN service is preferred in accordance with some embodiments.

FIG. 18B is a notional diagram illustrating triggers for prioritizing LTE in the case in which WLAN service is preferred in accordance with the embodiment method 1700 (FIG. 17). With reference to FIGS. 1-18B, a UE computing device may be in coverage of a WLAN (e.g., a WLAN coverage area) while also within the coverage area of a 5G SA network and an LTE network for a first period of time when a VoWiFi call starts. Before and after the start of the VoWiFi call, the UE computing device may be registered with the 5G SA network. The UE computing device may then transition from a first point within the WLAN coverage area to a second point outside the WLAN coverage area but within the coverage areas of the 5G SA and LTE networks. At some point in this transition, the WLAN signal becomes unstable (e.g., below a quality threshold), at which point the voice call will need to be transitioned to a WWAN network. If the 5G SA network does not support a voice call (e.g., VoNR), the 5G SA network may start EPS fallback by triggering the UE to switch from 5G SA to LTE to maintain the voice call on LTE. In the embodiment method 1700 (FIG. 17), when this happens the UE computing device may prioritize LTE over NR.

Figure 19:
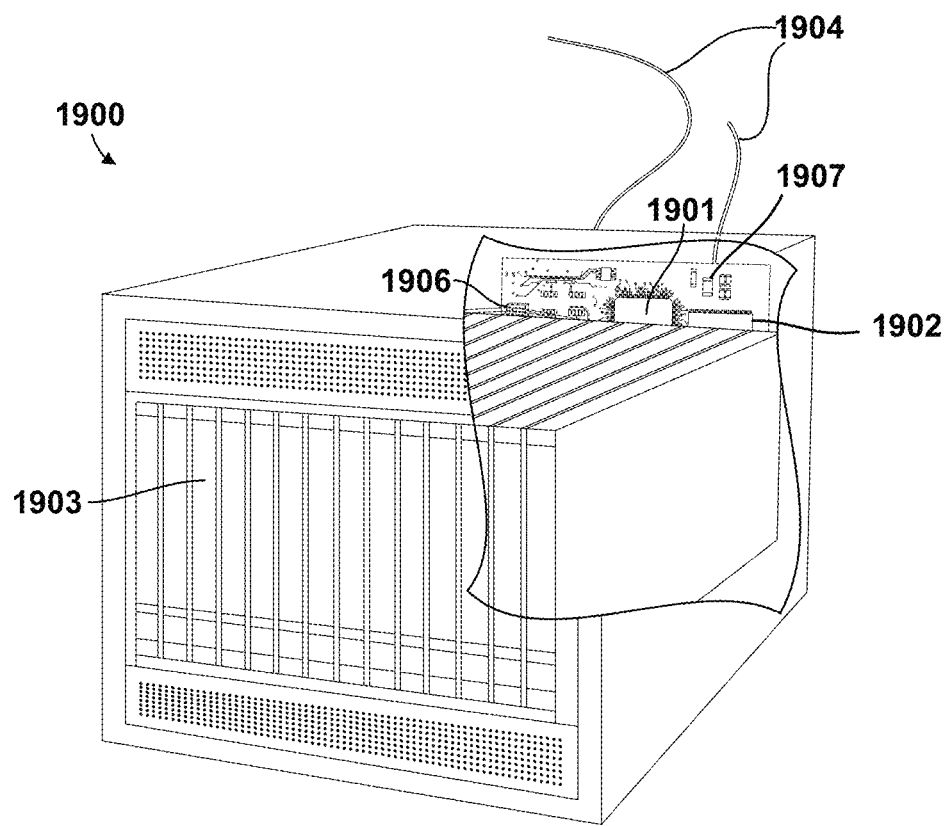
FIG. 19 is a component block diagram of a wireless router device suitable for supporting handover of a call in accordance with various embodiments.

Various embodiments may be implemented on a variety of wireless network devices, an example of which is illustrated in FIG. 19 in the form of a wireless network computing device 1900 functioning as a network element of a communication network, such as a base station. Such network computing devices may include at least the components illustrated in FIG. 19. With reference to FIGS. 1-19, the network computing device 1900 may typically include a processor 1901 coupled to volatile memory 1902 and a large capacity nonvolatile memory, such as a disk drive 1903. The network computing device 1900 may also include a peripheral memory access device such as a floppy disc drive, compact disc (CD) or digital video disc (DVD) drive 1906 coupled to the processor 1901. The network computing device 1900 may also include network access ports 1904 (or interfaces) coupled to the processor 1901 for establishing data connections with a network, such as the Internet and/or a local area network coupled to other system computers and servers. The network computing device 1900 may include one or more antennas 1907 for sending and receiving electromagnetic radiation that may be connected to a wireless communication link. The network computing device 1900 may include additional access ports, such as USB, Firewire, Thunderbolt, and the like for coupling to peripherals, external memory, or other devices.

Figure 20:
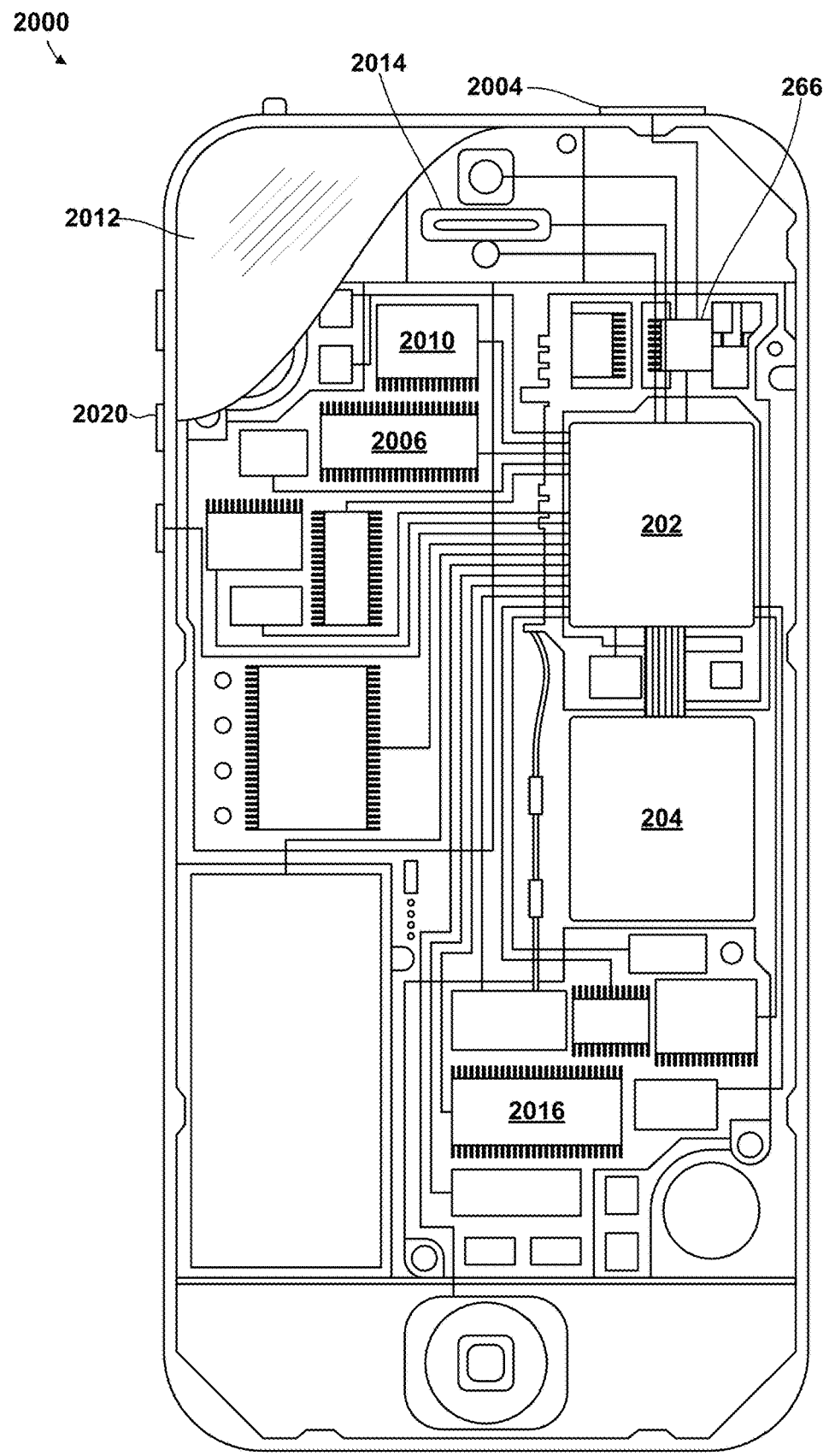
FIG. 20 is a component block diagram of a wireless communication device suitable for supporting handover of a call in accordance with various embodiments.

Various embodiments may be implemented on a variety of UE computing devices (e.g., the wireless device 120a-120e, 200, 320), an example of which is illustrated in FIG. 20 in the form of a smartphone 2000. With reference to FIGS. 1-20, the smartphone 2000 may include a first SOC 202 (e.g., a SOC-CPU) coupled to a second SOC 204 (e.g., a 5G capable SOC). The first and second SOCs 202, 204 may be coupled to internal memory 2006, 2016, a display 2012, and to a speaker 2014. Additionally, the smartphone 2000 may include an antenna 2004 for sending and receiving electromagnetic radiation that may be connected to a wireless data link and/or cellular telephone transceiver 266 coupled to one or more processors in the first and/or second SOCs 202, 204.

Smartphones 2000 typically also include menu selection buttons or rocker switches 2020 for receiving user inputs.

A typical smartphone 2000 also includes a sound encoding/decoding (CODEC) circuit 2010, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 266 and CODEC 2010 may include a digital signal processor (DSP) circuit (not shown separately).

The processors of the wireless network computing device 1900 and the smart phone 2000 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 2006, 2016 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a UE computing device and the UE computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500, 600, 700, 800, 900, 1000, 1100, 1200, and/or 1500 may be substituted for or combined with one or more operations of the methods 500, 600, 700, 800, 900, 1000, 1100, 1200, and/or 1500.

Implementation examples are described in the following paragraphs. While some of the following implementation examples are described in terms of example methods, further example implementations may include: the example methods discussed in the following paragraphs implemented by a UE comprising a processor configured with processor-executable instructions to perform operations of the methods of the following implementation examples; the example methods discussed in the following paragraphs implemented by a UE comprising means for performing functions of the methods of the following implementation examples; and the example methods discussed in the following paragraphs may be implemented as a non-transitory processor-readable storage medium having stored thereon processor-executable instructions configured to cause a processor of a UE to perform the operations of the methods of the following implementation examples.

Example 1. A method for supporting handover of a Voice over Internet Protocol (VoIP) call, comprising: determining, by a processor of a UE, that a voice call is active over a WLAN connection established by the UE; determining, by the processor of the UE, that VoNR is not supported in response to determining that the voice call is active over the WLAN connection established by the UE; and selecting, by the processor of the UE, LTE for handover of the voice call in response to determining that VoNR is not supported.

Example 2. The method of example 1, wherein the selecting LTE for handover of the voice call causes the UE to handover an IMS PDN connection established using the WLAN connection directly to an LTE connection without attempting to establish the IMS PDN connection with an 5GS during the handover.

Example 3. The method of any of examples 1-2, wherein determining that VoNR is not support comprises determining that the UE does not support VoNR or determining that a 5G SA network does not support VoNR.

Example 4. The method of any of examples 1-3, wherein selecting LTE for handover of the voice call in response to determining that VoNR is not supported comprises: prioritizing, by the processor of the UE, an LTE RAT over an NR RAT in response to determining that VoNR is not supported.

Example 5. The method of example 4, further comprising: determining, by the processor of the UE, that the voice call transferred to LTE or the voice call ended; and prioritizing, by the processor of the UE, the NR RAT over the LTE RAT in response to determining that that the voice call transferred to LTE or the voice call ended.

Example 6. The method of any of examples 4-5, further comprising: determining, by the processor of the UE, that VoNR is supported after prioritizing the LTE RAT over the NR RAT; and prioritizing, by the processor of the UE, the NR RAT over the LTE RAT in response to determining that VoNR is supported.

Example 7. The method of any of examples 4-6, further comprising: determining, by the processor of the UE, that NR RAT is in a connected state with the 5G SA network after prioritizing the LTE RAT over the NR RAT; and controlling, by the processor of the UE, the NR RAT to stay in the connected state until the NR RAT moves to an idle state.

Example 8. The method of any of examples 4-8, further comprising: determining, by the processor of the UE, whether an LTE signal measurement is above a quality threshold; and prioritizing, by the processor of the UE, the LTE RAT over the NR RAT in response to determining that the LTE signal measurement is above the quality threshold.

Example 9. The method of any of examples 4-8, further comprising: determining, by the processor of the UE, whether a WLAN signal measurement is below a quality threshold; and prioritizing, by the processor of the UE, the LTE RAT over the NR RAT in response to determining that the WLAN signal measurement is below the quality threshold.

Example 10. The method of any of examples 4-9, further comprising: attaching, by the processor of the UE, the LTE RAT to an LTE cell after prioritizing the LTE RAT over the NR RAT.

Example 11. The method of example 10, wherein prioritizing the LTE RAT includes ignoring redirection requests after attaching the LTE RAT to the LTE cell.

Example 12. The method of any of examples 1-3, wherein selecting LTE for handover of the voice call in response to determining that VoNR is not supported comprises: determining, by the processor of the UE, whether the UE is registered to the 5G SA network in response to determining that VoNR is not supported; determining, by the processor of the UE, whether a WLAN signal measurement is below a WLAN quality threshold or an LTE signal measurement is above a LTE quality threshold in response to determining that the UE is registered to the 5G SA network; and sending, by the processor of the UE, a service request to trigger Evolved Packet System (EPS) fallback to the 5G SA network in response to determining that the WLAN signal measurement is below the WLAN quality threshold or the LTE signal measurement is above the LTE quality threshold.

Example 13. The method of example 1, wherein determining whether VoNR is supported in response to determining that the voice call is active over the WLAN connection established by the UE comprises: determining whether EPS fallback occurs in response to determining that the voice call is active over the WLAN connection established by the UE; and prioritizing the LTE RAT over the NR RAT in response to determining that EPS fallback occurs.

Example 14. The method of example 12, further comprising: determining, by the processor of the UE, that EPS fallback is complete; and controlling, by the processor of the UE, an LTE radio access technology (RAT) to handover the voice call to an LTE connection.

Example 15. The method of any of examples 1-13, wherein the handover of the voice call to the LTE connection is a handover of the IMS PDN connection from the evolved Packet Data Gateway (ePDG) to LTE.

Example 16. The method of any of examples 1-14, wherein the WLAN connection is a Wi-Fi connection.

Example 17. The method of any of examples 1-15, wherein handover of the voice call occurs while the UE is in a 5G SA network coverage area.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for supporting handover of a Voice over Internet Protocol (VoIP) call, comprising:
   determining, by a processor of a user equipment (UE), whether a voice call is active over a wireless local area network (WLAN) connection established by the UE;
   determining, by the processor of the UE, whether Voice over New Radio (VoNR) is supported in response to determining that the voice call is active over the WLAN connection established by the UE, wherein determining whether VoNR is supported is based on at least one of configuration settings in the UE and network signaling;
   selecting, by the processor of the UE, Long Term Evolution (LTE) for handover of the voice call in response to determining that VoNR is not supported, wherein selecting LTE for handover of the voice call comprises overwriting, by the processor of the UE and while the voice call is active over the WLAN connection established by the UE, a value associated with at least one of LTE and New Radio (NR) used in an access stratum procedure of a modem of the UE;
   initiating, by the processor of the UE, a handover of an Internet Protocol an Multimedia Subsystem (IMS) Packet Data Network (PDN) connection established using the WLAN connection directly to an LTE connection without attempting to establish the IMS PDN connection with an available fifth generation (5G) system (5GS) during the handover in response to selecting LTE for handover of the voice call.

2. The method of any of claim 1, wherein determining whether VoNR is supported further comprises determining that the UE does not support VoNR or determining that a fifth generation (5G) standalone (SA) network does not support VoNR.

3. The method of any of claim 1, wherein selecting LTE for handover of the voice call in response to determining that VoNR is not supported comprises:

prioritizing, by the processor of the UE, an LTE radio access technology (RAT) over a NR RAT in response to determining that VoNR is not supported.

4. The method of claim 3, further comprising:
determining, by the processor of the UE, whether the voice call transferred to LTE or the voice call ended; and
prioritizing, by the processor of the UE, the NR RAT over the LTE RAT in response to determining that that the voice call transferred to LTE or the voice call ended.

5. The method of claim 3, further comprising:
determining, by the processor of the UE, whether VoNR is supported after prioritizing the LTE RAT over the NR RAT; and
prioritizing, by the processor of the UE, the NR RAT over the LTE RAT in response to determining that VoNR is supported.

6. The method of claim 3, further comprising:
determining, by the processor of the UE, whether NR RAT is in a connected state with the 5G SA network after prioritizing the LTE RAT over the NR RAT; and
controlling, by the processor of the UE, the NR RAT to stay in the connected state until the NR RAT moves to an idle state.

7. The method of claim 3, further comprising:
determining, by the processor of the UE, whether an LTE signal measurement is above a quality threshold; and
prioritizing, by the processor of the UE, the LTE RAT over the NR RAT in response to determining that the LTE signal measurement is above the quality threshold.

8. The method of claim 3, further comprising:
determining, by the processor of the UE, whether a WLAN signal measurement is below a quality threshold; and
prioritizing, by the processor of the UE, the LTE RAT over the NR RAT in response to determining that the WLAN signal measurement is below the quality threshold.

9. The method of claim 3, further comprising:
attaching, by the processor of the UE, the LTE RAT to an LTE cell after prioritizing the LTE RAT over the NR RAT,
wherein prioritizing the LTE RAT includes ignoring redirection from LTE to NR requests after attaching the LTE RAT to the LTE cell.

10. The method of claim 1, wherein selecting LTE for handover of the voice call in response to determining that VoNR is not supported comprises:
determining, by the processor of the UE, whether the UE is registered to the 5G SA network in response to determining that VoNR is not supported;
determining, by the processor of the UE, whether a WLAN signal measurement is below a WLAN quality threshold or an LTE signal measurement is above an LTE quality threshold in response to determining that the UE is registered to the 5G SA network; and
sending, by the processor of the UE, a service request to trigger Evolved Packet System (EPS) fallback to the 5G SA network in response to determining that the WLAN signal measurement is below the WLAN quality threshold or the LTE signal measurement is above the LTE quality threshold.

11. The method of claim 10, further comprising:
determining, by the processor of the UE, that EPS fallback is complete; and controlling, by the processor of the UE, an LTE radio access technology (RAT) to handover the voice call to an LTE connection.

12. The method of claim 1, wherein determining whether VoNR is supported in response to determining that the voice call is active over the WLAN connection established by the UE comprises:
determining whether EPS fallback occurs in response to determining that the voice call is active over the WLAN connection established by the UE; and
prioritizing the LTE RAT over the NR RAT in response to determining that EPS fallback occurs.

13. The method of claim 2, wherein the handover of the voice call to the LTE connection is a handover of the IMS PDN connection from an evolved Packet Data Gateway (ePDG) to LTE.

14. The method of claim 1, wherein the WLAN connection is a Wi-Fi connection.

15. The method of claim 1, wherein handover of the voice call occurs while the UE is in a fifth generation (5G) standalone (SA) network coverage area.

16. A user equipment (UE), comprising:
a wireless transceiver; and
a processor coupled to the wireless transceiver and configured with processor-executable instructions to:
determine whether a voice call is active over a wireless local area network (WLAN) connection established by the UE;
determine whether Voice over New Radio (VoNR) is not supported in response to determining that the voice call is active over the WLAN connection established by the UE, wherein determining whether VoNR is supported is based on at least one of configuration settings in the UE and network signaling;
select Long Term Evolution (LTE) for handover of the voice call in response to determining that VoNR is not supported, wherein selecting LTE for handover of the voice call comprises overwriting, by the UE and while the voice call is active over the WLAN connection established by the UE, a value associated with at least one of LTE and New Radio (NR) used in an access stratum procedure of a modem of the UE; and
initiate a handover of an Internet Protocol an Multimedia Subsystem (IMS) Packet Data Network (PDN) connection established using the WLAN connection directly to an LTE connection without attempting to establish the IMS PDN connection with an available fifth generation (5G) system (5GS) during the handover in response to selecting LTE for handover of the voice call.

17. The UE of claim 16, wherein the processor is configured with processor-executable instructions to perform operations such that selecting LTE for handover of the voice call in response to determining that VoNR is not supported comprises:
prioritizing, by the processor of the UE, an LTE radio access technology (RAT) over a NR RAT in response to determining that VoNR is not supported.

18. The UE of claim 17, wherein the processor is configured with processor-executable instructions to perform operations further comprising:
determining, by the processor of the UE, that the voice call transferred to LTE or the voice call ended; and prioritizing, by the processor of the UE, the NR RAT over the LTE RAT in response to determining that that the voice call transferred to LTE or the voice call ended.

19. The UE of claim 17, wherein the processor is configured with processor-executable instructions to perform operations further comprising:
   determining, by the processor of the UE, that VoNR is supported after prioritizing the LTE RAT over the NR RAT; and
   prioritizing, by the processor of the UE, the NR RAT over the LTE RAT in response to determining that VoNR is supported.

20. The UE of claim 17, wherein the processor is configured with processor-executable instructions to perform operations further comprising:
   determining, by the processor of the UE, that NR RAT is in a connected state with the 5G SA network after prioritizing the LTE RAT over the NR RAT; and
   controlling, by the processor of the UE, the NR RAT to stay in the connected state until the NR RAT moves to an idle state.

21. The UE of claim 17, wherein the processor is configured with processor-executable instructions to perform operations further comprising:
   determining, by the processor of the UE, whether an LTE signal measurement is above a quality threshold; and
   prioritizing, by the processor of the UE, the LTE RAT over the NR RAT in response to determining that the LTE signal measurement is above the quality threshold.

22. The UE of claim 17, wherein the processor is configured with processor-executable instructions to perform operations further comprising:
   determining, by the processor of the UE, whether a WLAN signal measurement is below a quality threshold; and
   prioritizing, by the processor of the UE, the LTE RAT over the NR RAT in response to determining that the WLAN signal measurement is below the quality threshold.

23. The UE of claim 17, wherein the processor is configured with processor-executable instructions to perform operations further comprising:
   attaching, by the processor of the UE, the LTE RAT to an LTE cell after prioritizing the LTE RAT over the NR RAT
   wherein prioritizing the LTE RAT includes ignoring redirection from LTE to NR requests after attaching the LTE RAT to the LTE cell.

24. The UE of claim 16, wherein the processor is configured with processor-executable instructions to perform operations such that selecting LTE for handover of the voice call in response to determining that VoNR is not supported comprises:
   determining, by the processor of the UE, whether the UE is registered to the 5G SA network in response to determining that VoNR is not supported;
   determining, by the processor of the UE, whether a WLAN signal measurement is below a WLAN quality threshold or an LTE signal measurement is above an LTE quality threshold in response to determining that the UE is registered to the 5G SA network; and
   sending, by the processor of the UE, a service request to trigger Evolved Packet System (EPS) fallback to the 5G SA network in response to determining that the WLAN signal measurement is below the WLAN quality threshold or the LTE signal measurement is above the LTE quality threshold.

25. The UE of claim 24, wherein the processor is configured with processor-executable instructions to perform operations further comprising:
   determining, by the processor of the UE, that EPS fallback is complete; and
   controlling, by the processor of the UE, an LTE radio access technology (RAT) to handover the voice call to an LTE connection.

26. The UE of claim 16, wherein the processor is configured with processor-executable instructions to perform operations such that determining whether VoNR is supported in response to determining that the voice call is active over the WLAN connection established by the UE comprises:
   determining whether EPS fallback occurs in response to determining that the voice call is active over the WLAN connection established by the UE; and
   prioritizing the LTE RAT over the NR RAT in response to determining that EPS fallback occurs.

27. A non-transitory processor-readable medium having stored thereon processor-executable instructions configured to cause a processor of a computing device to perform operations comprising:
   determining whether a voice call is active over a wireless local area network (WLAN) connection established by the UE;
   determining whether Voice over New Radio (VoNR) is supported in response to determining that the voice call is active over the WLAN connection established by the UE, wherein determining whether VoNR is supported is based on at least one of configuration settings in the UE and network signaling;
   selecting Long Term Evolution (LTE) for handover of the voice call in response to determining that VoNR is not supported, wherein selecting LTE for handover of the voice call comprises overwriting, by the UE and while the voice call is active over the WLAN connection established by the UE, a value associated with at least one of LTE and New Radio (NR) used in an access stratum procedure of a modem of the UE; and
   initiating a handover of an Internet Protocol an Multimedia Subsystem (IMS) Packet Data Network (PDN) connection established using the WLAN connection directly to an LTE connection without attempting to establish the IMS PDN connection with an available fifth generation (5G) system (5GS) during the handover in response to selecting LTE for handover of the voice call.

28. A user equipment (UE), comprising:
   means for determining whether a voice call is active over a wireless local area network (WLAN) connection established by the UE;
   means for determining whether Voice over New Radio (VoNR) is supported in response to determining that the voice call is active over the WLAN connection established by the UE, wherein the means for determining whether VoNR is supported utilizes at least one of configuration settings in the UE and network signaling;
   means for selecting Long Term Evolution (LTE) for handover of the voice call in response to determining that VoNR is not supported, wherein the means for selecting LTE for handover of the voice call comprises means for overwriting, by the UE and while the voice call is active over the WLAN connection established by the UE, a value associated with at least one of LTE and New Radio (NR) used in an access stratum procedure of a modem of the UE; and means for initiating a handover of an Internet Protocol (IP) Multimedia Subsystem (IMS) Packet Data Network (PDN) connection established using the WLAN connection directly to an LTE connection without attempting to establish the IMS PDN connection with an available fifth generation (5G) system (5GS) during the handover in response to selecting LTE for handover of the voice call.

* * * * *